US012436276B1

(12) United States Patent
Rao et al.

(10) Patent No.: US 12,436,276 B1
(45) Date of Patent: Oct. 7, 2025

(54) COORDINATING PRESENCE DETECTION AND PROXIMITY SENSING USING ULTRASONIC SIGNALS

(71) Applicant: Amazon Technologies, Inc., Seattle, WA (US)

(72) Inventors: Harsha Inna Kedage Rao, Campbell, CA (US); Vamshi Krishna Chillara, Quincy, MA (US); Krishna Kamath Koteshwara, Santa Clara, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 18/373,115

(22) Filed: Sep. 26, 2023

(51) Int. Cl.
  *G01S 15/58* (2006.01)
  *G01S 7/521* (2006.01)

(52) U.S. Cl.
  CPC ............ *G01S 15/586* (2013.01); *G01S 7/521* (2013.01)

(58) Field of Classification Search
  CPC ................................ G01S 15/586; G01S 7/521
  See application file for complete search history.

(56) References Cited

U.S. PATENT DOCUMENTS

2017/0329431 A1\* 11/2017 Lin .......................... G01S 7/539

FOREIGN PATENT DOCUMENTS

| CN | 214177348 U | \* | 9/2021 | |
|---|---|---|---|---|
| WO | WO-9724986 A2 | \* | 7/1997 | ............... A61B 8/06 |
| WO | WO-2021017945 A1 | \* | 2/2021 | ............... G01S 11/14 |

\* cited by examiner

*Primary Examiner* — Chico A Foxx
(74) *Attorney, Agent, or Firm* — Eversheds Sutherland (US) LLP

(57) ABSTRACT

Techniques for user devices to coordinate the emission of ultrasonic signals on behalf of different ultrasonic applications running on the user devices. User devices may have an ultrasonic front end that provides various ultrasonic applications, such as presence detection and proximity sensing, sleep monitoring, temperature and humidity sensing, and heartbeat monitoring. To perform the different functions, the ultrasonic applications use active sensing, or the transmission of ultrasonic signals to collect data about the environments around the user devices. However, the ultrasonic applications often use specific ultrasonic signals having different waveforms in order to collect the data used for their specific functionality. The ultrasonic front end may perform techniques to coordinate mutually exclusive emissions of the ultrasonic signals on behalf of the different ultrasonic applications based on various considerations, such as application priorities, operating schedules of the applications, and applications that can use the same waveform to collect data.

20 Claims, 19 Drawing Sheets

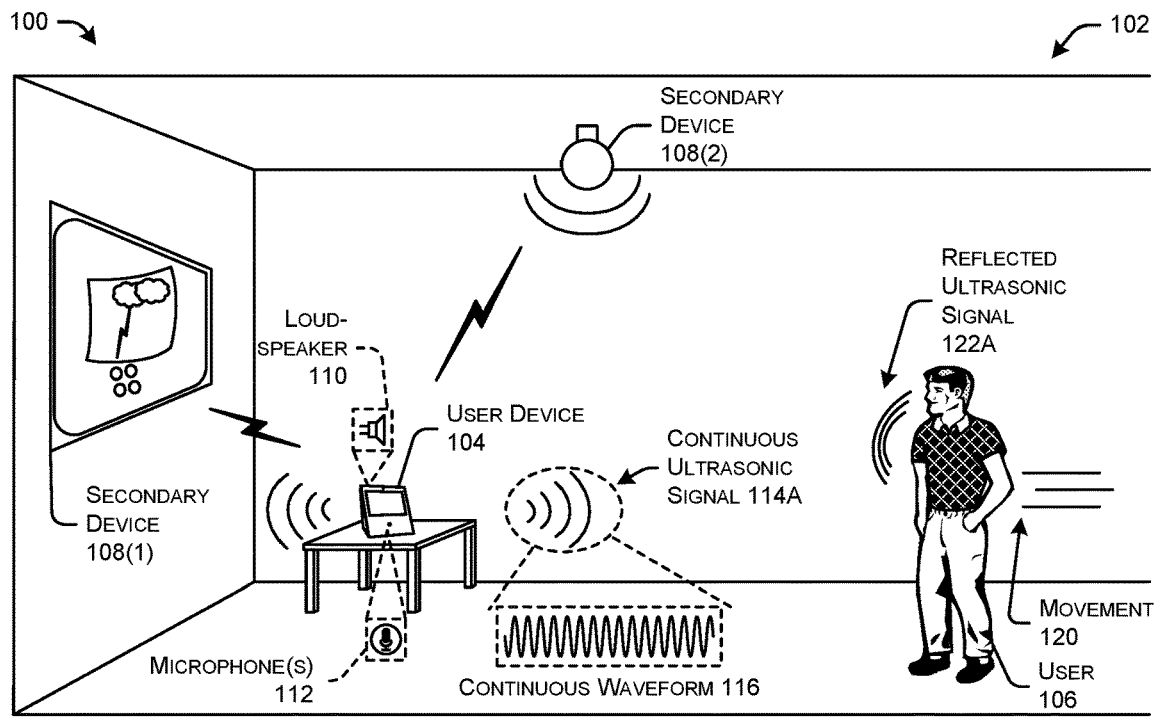
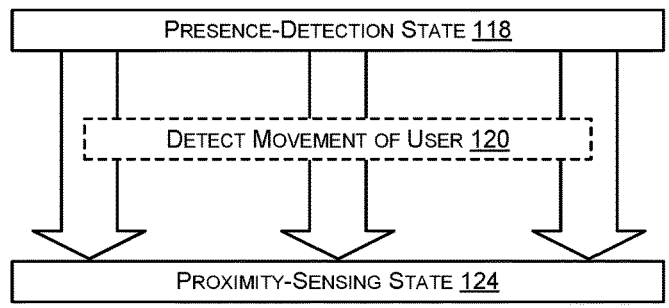
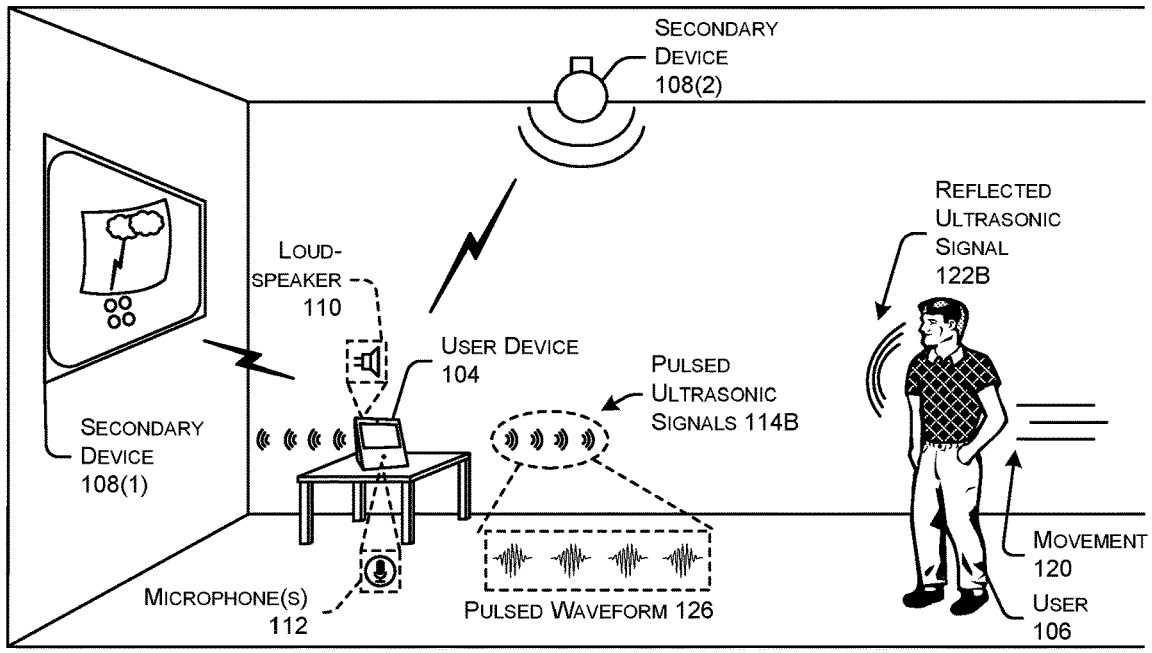
FIG. 1

1200 ⤴

```
┌─────────────────────────────────────────────────────────────────┐
│ EXECUTE A FIRST APPLICATION ON THE COMPUTING DEVICE, THE FIRST  │
│ APPLICATION PERFORMING A FIRST FUNCTION AT LEAST PARTLY USING A │
│                   FIRST ULTRASONIC SIGNAL                       │
│                             1202                                │
└─────────────────────────────────────────────────────────────────┘
                                  ↓
┌─────────────────────────────────────────────────────────────────┐
│ EXECUTE A SECOND APPLICATION ON THE COMPUTING DEVICE, THE SECOND│
│ APPLICATION PERFORMING A SECOND FUNCTION AT LEAST PARTLY USING A│
│                   SECOND ULTRASONIC SIGNAL                      │
│                             1204                                │
└─────────────────────────────────────────────────────────────────┘
                                  ↓
┌─────────────────────────────────────────────────────────────────┐
│   EMIT THE FIRST ULTRASONIC SIGNAL INTO AN ENVIRONMENT FOR A    │
│                       FIRST PERIOD OF TIME                      │
│                             1206                                │
└─────────────────────────────────────────────────────────────────┘
                                  ↓
┌─────────────────────────────────────────────────────────────────┐
│ GENERATE FIRST AUDIO DATA REPRESENTING A FIRST REFLECTED SIGNAL │
│         CORRESPONDING TO THE FIRST ULTRASONIC SIGNAL            │
│                             1208                                │
└─────────────────────────────────────────────────────────────────┘
                                  ↓
┌─────────────────────────────────────────────────────────────────┐
│ PROVIDE THE FIRST AUDIO DATA TO THE FIRST APPLICATION, THE FIRST│
│ AUDIO DATA BEING USABLE BY THE FIRST APPLICATION TO PERFORM THE │
│                         FIRST FUNCTION                          │
│                             1210                                │
└─────────────────────────────────────────────────────────────────┘
                                  ↓
┌─────────────────────────────────────────────────────────────────┐
│ RECEIVE A REQUEST TO EMIT THE SECOND ULTRASONIC SIGNAL FOR THE  │
│                      SECOND APPLICATION                         │
│                             1212                                │
└─────────────────────────────────────────────────────────────────┘
                                  ↓
                                (12B)
```

IDENTIFY A FIRST PRIORITY OF THE FIRST APPLICATION
1214

IDENTIFY A SECOND PRIORITY OF THE SECOND APPLICATION
1216

STOP EMITTING THE FIRST ULTRASONIC SIGNAL
1218

EMIT THE SECOND ULTRASONIC SIGNAL INTO THE ENVIRONMENT FOR A SECOND PERIOD OF TIME
1220

GENERATE SECOND AUDIO DATA REPRESENTING A SECOND REFLECTED SIGNAL CORRESPONDING TO THE SECOND ULTRASONIC SIGNAL
1222

PROVIDE THE SECOND AUDIO DATA TO THE SECOND APPLICATION, THE SECOND AUDIO DATA BEING USABLE BY THE SECOND APPLICATION TO PERFORM THE SECOND FUNCTION
1224

```
┌─────────────────────────────────────────────────────────────────┐
│ CAUSE, BY A FIRST APPLICATION RUNNING ON THE COMPUTING DEVICE,   │
│ OUTPUT OF A FIRST ULTRASONIC SIGNAL INTO AN ENVIRONMENT OF       │
│ THE COMPUTING DEVICE                                             │
│                              1302                                │
└─────────────────────────────────────────────────────────────────┘
                                 │
                                 ▼
┌─────────────────────────────────────────────────────────────────┐
│ GENERATE FIRST DATA REPRESENTING A FIRST REFLECTED SIGNAL        │
│ CORRESPONDING TO THE FIRST ULTRASONIC SIGNAL                     │
│                              1304                                │
└─────────────────────────────────────────────────────────────────┘
                                 │
                                 ▼
┌─────────────────────────────────────────────────────────────────┐
│ PROVIDE THE FIRST DATA TO THE FIRST APPLICATION, THE FIRST DATA  │
│ BEING USABLE BY THE FIRST APPLICATION TO PERFORM A FIRST         │
│ FUNCTION                                                         │
│                              1306                                │
└─────────────────────────────────────────────────────────────────┘
                                 │
                                 ▼
┌─────────────────────────────────────────────────────────────────┐
│ CAUSE THE LOUDSPEAKER TO STOP EMITTING THE FIRST ULTRASONIC      │
│ SIGNAL                                                           │
│                              1308                                │
└─────────────────────────────────────────────────────────────────┘
                                 │
                                 ▼
┌─────────────────────────────────────────────────────────────────┐
│ CAUSE, BY A SECOND APPLICATION RUNNING ON THE COMPUTING DEVICE,  │
│ THE LOUDSPEAKER TO EMIT A SECOND ULTRASONIC SIGNAL HAVING A      │
│ SECOND WAVEFORM INTO THE ENVIRONMENT, THE FIRST WAVEFORM         │
│ BEING DIFFERENT THAN THE SECOND WAVEFORM                         │
│                              1310                                │
└─────────────────────────────────────────────────────────────────┘
                                 │
                                 ▼
┌─────────────────────────────────────────────────────────────────┐
│ GENERATE SECOND DATA REPRESENTING A SECOND REFLECTED SIGNAL      │
│ CORRESPONDING TO THE SECOND ULTRASONIC SIGNAL                    │
│                              1312                                │
└─────────────────────────────────────────────────────────────────┘
                                 │
                                 ▼
┌─────────────────────────────────────────────────────────────────┐
│ PROVIDE THE SECOND DATA TO THE SECOND APPLICATION, THE SECOND    │
│ DATA BEING USABLE BY THE SECOND APPLICATION TO PERFORM A         │
│ SECOND FUNCTION                                                  │
│                              1314                                │
└─────────────────────────────────────────────────────────────────┘
```

FIG. 13

COORDINATING PRESENCE DETECTION AND PROXIMITY SENSING USING ULTRASONIC SIGNALS

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. To perform many of these types of presence-sensing techniques, the presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emission of large amounts of heat, etc. Additionally, beyond being able to detect presence or motion, existing presence-sensing devices are unable to provide further contextual information about the motion in the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 shows an illustrative interactive architecture set in a home environment. The architecture includes a user device that emits continuous ultrasonic signals to detect presence of a user, and then emits pulsed ultrasonic signals to detect a proximity of the user relative to the user device.

FIGS. 12A and 12B collectively illustrate a flow diagram of an example process for coordinating the emissions of ultrasonic signals on behalf of different ultrasonic applications that are operating on a computing device based on priorities of the applications.

FIG. 13 illustrates a flow diagram of an example process for coordinating the emissions of ultrasonic signals with different waveforms on behalf of different ultrasonic applications.

DETAILED DESCRIPTION

Figure 2:
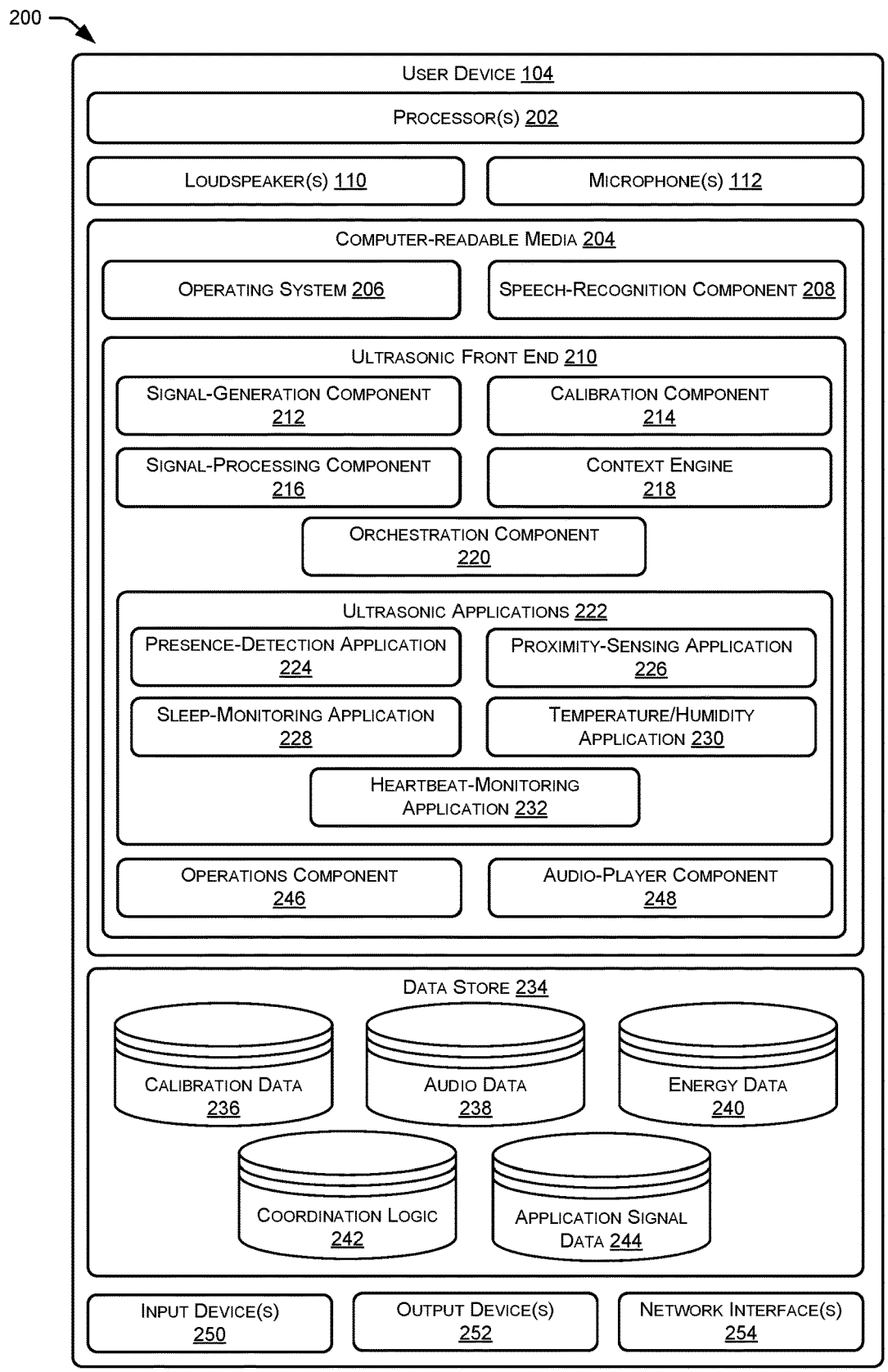
FIG. 2 illustrates an example component diagram of a user device.

This disclosure describes, in part, user devices that coordinate the emission of ultrasonic signals on behalf of different ultrasonic applications running on the user devices. User devices may have an ultrasonic front end that acts as a unified interface to support various ultrasonic applications, such as presence detection and proximity sensing, sleep monitoring, temperature and humidity sensing, and heartbeat monitoring. To perform these various functions, the ultrasonic applications use active sensing, or the transmission of ultrasonic signals to collect data about the environments around the user devices. There may be instances where multiple ultrasonic applications running on a device would all like to operate and collect ultrasonic data. However, the ultrasonic applications may use specific ultrasonic signals having different waveforms in order to collect the data needed for their specific use case or functionality. Accordingly, concurrent emission of the different ultrasonic signals may result in poor performance for the applications. In light of this, the ultrasonic front end may perform techniques to coordinate mutually-exclusive emissions of the ultrasonic signals on behalf of the different ultrasonic applications based on various considerations, such as application priorities, operating schedules of the applications, and applications that can use the same waveform to collect data.

The user devices described herein may be installed or placed by users in various locations to monitor different environments, such as various rooms of a house. For instance, the user device may be a display device that presents content to users, a light switch that is installed in a room, a voice-interface device moved into a room to interact with a user through voice, or a security-system device to monitor a location. Upon being installed or powered up in the room or other environment, and/or periodically, the user device may undergo a calibration process to determine an optimized carrier frequency at which to emit the ultrasonic signals in the room.

In such examples, a calibration component of the user device may use a loudspeaker of the device to emit an ultrasonic calibration signal (e.g., an ultrasonic sweep signal/tone), generate audio data using one or more microphones that represents the ultrasonic calibration signal, and analyze that audio data to determine an optimal frequency range to use for subsequent ultrasonic signal transmissions. The user device may analyze various frequency bands of a sweep representing the ultrasonic calibration signal, and select the frequency band or range that has the most desirable signal-to-noise (SNR) ratio to emit the ultrasonic calibration signal. The calibration component may store the results (e.g., generated audio data, processed audio data, etc.) of the calibration process for later use. This may be helpful for cases where different ultrasonic applications emit ultrasonic signals in different frequency bands, at different carrier frequencies, and/or with different gains. The calibration component may store the calibration data for use by the various ultrasonic applications to determine optimal emission metrics for their respective ultrasonic signals and/or waveforms.

Many of the functions performed by ultrasonic applications are to help monitor the users of the devices, such as controlling devices in an environment in which a user is moving, or monitoring a user's sleep quality at night. Thus, the user device may be configured to be in a default mode of presence detection where the user device continuously, or periodically, emits ultrasonic signals to detect movement of a user in a room, and thus the presence of a user. Accordingly, the ultrasonic front end may include a presence-detection application that is configured to use ultrasonic signals to detect the presence of a user in an environment. To accomplish this, the presence-detection application may cause the loudspeaker to emit ultrasonic signals into an environment, and characterize a change in the frequency, or the Doppler shift, of the reflections of the ultrasonic signals off the user caused by the movement of the person relative to the user devices. The presence-detection application may use various algorithms when analyzing the audio data to detect movement, and the algorithms are generally based upon the Doppler Effect. The Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

To detect presence, the presence-detection application uses a microphone to generate audio data that represents at least the reflections of the ultrasonic signals that are emitted into the environment by the loudspeaker. In some examples, the ultrasonic signals used for presence detection may be continuous and have a sinusoidal waveform, or another Gaussian waveform. The user devices may capture audio data for a sufficiently long enough period of time to help ensure that the movement by a person may be detected using the reflection of the ultrasonic signal off the person as they move. As described in more detail below, the audio data generated by the microphone that represents the reflections of the ultrasonic signal may undergo various processing and analysis to determine whether the frequency response of the reflection of the ultrasonic signal indicates a reflection off of a moving object (e.g., user) due to the Doppler effect.

However, various difficulties may arise when the presence-detection application emits ultrasonic signals for presence detection. For instance, user devices that continuously emit ultrasonic signals to detect motion may experience reduced battery life, increased likelihood of overheating, and potentially other negative effects. To reduce these negative effects, the presence-detection application may use various techniques to alter the emission levels of ultrasonic signals. For instance, the presence-detection application may emit ultrasonic signals until motion is detected. Once motion is detected, the presence-detection application may stop emitting ultrasonic signals for a period of time, or "poll" the emission of the ultrasonic signal. The polling may be for set periods of time, and those periods of time may be configurable based on different embodiments. In one example, if the presence-detection application has been frequently detecting movement, the presence-detection application may increase the period of time during which ultrasonic emissions are stopped or reduced, such as according to a Fibonacci sequence (e.g., 30 seconds, 60 seconds, 120 seconds, etc.).

According to the techniques described herein, the ultrasonic front end may take advantage of these polling periods that the presence-detection application utilizes. For instance, the ultrasonic front end may cause another ultrasonic application to emit ultrasonic signals during these polling periods, such as a proximity-sensing application. That is, the proximity-sensing application may determine a distance, or proximity, of a user relative to the user device during these polling periods. The proximity-sensing application may cause the loudspeaker to emit pulsed ultrasonic signals into the environment, and detect a change in the energy measurements of the reflections of the pulsed ultrasonic signals off the person caused by the movement of the person relative to the user device. The changes in energy measurements, and round trip time-of-flight (ToF) of the signals, can be used to determine distances between the user and the user device. The proximity-sensing application may cause the loudspeaker to emit pulsed ultrasonic signals, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.). The proximity-sensing application may use the microphone to generate data representing reflections of the pulsed ultrasonic signals, and may analyze the data on a frame-by-frame basis to determine that a user is moving around the user device, and a distance between the user and the user device. In one illustrative example, the proximity-sensing application may determine whether a user is within a threshold distance (e.g., 3 feet, 4 feet, etc.) to a user device that has a display. If the user is within the threshold distance, the user device may cause content to be presented on the display, or change a size of the content being displayed.

The ultrasonic front end may maintain and use various logic or rules for arbitrating between which of the ultrasonic applications are to have exclusive use of the loudspeaker to emit ultrasonic signals. In some examples, the applications may be assigned different priorities that are used to select between ultrasonic applications that are requesting use of the loudspeaker. As another example, certain applications may request use of the loudspeaker according to a predefined schedule. For instance, a sleep-monitoring application may request to emit ultrasonic signals at night when a user is sleeping. In such cases, the sleep-monitoring application may get priority to use the loudspeaker to emit ultrasonic signals for sleep monitoring. In some examples, the ultrasonic front end may interrupt a long-running ultrasonic application (e.g., presence detection application) to periodically, or upon user request, emit an ultrasonic signal for another application. For instance, a user may interact with an application and request a temperature reading from a temperature application. In such an example, and the ultrasonic front end may interrupt the emission of ultrasonic signals for a presence-detection application in order to emit ultrasonic signals required by a temperature application.

As briefly noted above, the ultrasonic applications may emit ultrasonic signals having different waveforms that are optimal for collecting the data used by those applications. For instance, a heartbeat-detection application may utilize a frequency modulated continuous wave (FMCW) waveform, a presence-detection application may utilize a continuous single-tone waveform (sinusoidal, Gaussian, etc.), and a proximity-sensing application may utilize a pulsed tone waveform. Accordingly, the loudspeaker may be provided with audio data representing an appropriate waveform for the ultrasonic application that is emitting ultrasonic signals using the loudspeaker.

In some instances, multiple applications may be configured to utilize data generated from ultrasonic signal reflections of a same waveform. As an example, a sleep monitoring application and a heartbeat detection application may both utilize audio data that represents reflection signals having the FMCW waveform. In such instances, a signal-processing component of the ultrasonic front end may be provided with the audio data generated from a microphone that represents the reflection signals having the FMCW waveform. The signal-processing component may perform various processing techniques on the audio data, such as applying high-pass and/or low-pass filters to remove unwanted frequencies, and down-sampling the audio data to a lower sampling or frequency for baseband processing (generally, the audio data that represents the movement of the user is at a lower frequency range than the transmission frequency range). After processing the audio data, the pre-processing unit may provide each of the ultrasonic applications with the resulting data such that each application does not need to individually process the audio data before further use or analysis.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative interactive architecture 100 set in a home environment 102. The architecture includes a user device 104 that emits continuous ultrasonic signals to detect the presence of a user 106, and then emits pulsed ultrasonic signals to detect a proximity of the user 106 relative to the user device 104.

The architecture 100 includes at least one user device 104 controlling secondary devices 108 (e.g., television 108(1), light 108(2), or any other controllable device) physically situated in the home 102 based on detecting presence of the user 106. In this example, the user device 104 includes or comprises a display device that has a loudspeaker 110 and one or more microphones 112 to detect presence and proximity of the user 106.

As shown in FIG. 1, the loudspeaker 110 of the user device 104 may transmit, or otherwise output, an emitted sound. Generally, the loudspeaker 110 may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound may include at a continuous ultrasonic signal that is emitted sound at a frequency that is outside the frequency range in which humans can hear sound (e.g., over 20 kHz). Thus, the loudspeaker 110 may be emitting sound, such as ultrasonic signals, that may be traditionally out-of-band for the loudspeaker 110. FIG. 1 may represent a high-level process performed by the user device 104 in order to detect movement of an object, such as the user 106. The user device 104 may cause the loudspeaker 110 to emit the continuous ultrasonic signal 114A into the home 102. In some examples, the user device 104 may continuously cause the loudspeaker 110 to emit the continuous ultrasonic signal 114A, while in other examples, the continuous ultrasonic signal 114A may be emitted periodically.

Upon being emitted, the continuous ultrasonic signal 114A will generally reflect off of objects in the home 102. As briefly mentioned above, when the continuous ultrasonic signal 114A bounces off objects, various changes to the characteristics of the audio signal may occur. For instance, as mentioned above, the Doppler effect (or Doppler shift) is one such change in audio signal characteristics where the frequency or wavelength of a wave, such as an emitted sound wave, changes in relation to an emitting object upon bouncing off of a moving object. In the illustrated example, the continuous ultrasonic signal 114A may experience a change in frequency upon reflecting off the user 106 if the user 106 is moving. Thus, because there is movement 120 user 106, the reflected ultrasonic signal 122A (or reflected sound) may experience a change in frequency. Generally, if the movement 120 of the user 106 is towards the loudspeaker, then the reflected ultrasonic signal 122A may have a higher frequency compared to the continuous ultrasonic signal 114A when detected at the user device 104. Conversely, the reflected ultrasonic signal 122A may have a lower frequency relative to the user device 104 compared to the continuous ultrasonic signal 114A when the movement 120 of the user 106 is away from the user device 104.

The user device 104 may use the microphone(s) 112 to generate audio data representing the reflected ultrasonic signals 122A. In some examples, the microphone(s) 112 may include a single microphone, or two or more microphones arranged on, or in, the user device 104 in any pattern (e.g., rows of microphones, circular pattern on a surface, offset and/or alternating rows of microphones, etc.). Further, the microphones 112 may be facing, or oriented, in different directions to capture sound from different directions with a better signal-to-noise ratio. Additionally, or alternatively, the user device 104 may perform acoustic processing on audio data/signals generated by the microphones 112 in order to perform beamforming to perform directional signal/sound reception in the home environment 102. In this way, the microphones 112 may be configured to detect sound from different regions of the home 102 with stronger SNR values. Generally, the microphones 112 may comprise transducers that convert sound (e.g., reflected ultrasonic signal(s) 122) into electrical signals, or audio data.

The user device 104 may include one or more components which extract feature data from the audio data. In some examples, each of the one or more microphones 112 may create an audio channel, thus creating a multi-channel flow of audio data. The components may perform various processing on the audio data channels (e.g., filtering, down sampling, Fourier transform(s), log-transform(s), etc.) prior to extracting the feature data. In some examples, the components of the user device 104 may extract magnitude feature data and phase feature data that represent the frequency of the reflected ultrasonic signal 122A as detected by the one or more microphones 112 for periods of time to determine if movement 120 of the user 106 exists in the home 102.

For example, in order to analyze the data to determine whether the reflected ultrasonic signal 122A indicates movement 120 of the user 106 due to a change in frequency according to the Doppler effect, the user device 104 may divide the signal represented in the data into its frequency components, or its magnitude and phase components. For instance, the user device 104 may utilize one or more algorithms, such as Fast Fourier transform (FFT), to transform the signal represented in the data in the time domain into the frequency domain, and represent the frequency of the reflected ultrasonic signal 122A by the magnitude and phase components.

Once the reflected ultrasonic signal 122A is represented by its magnitude and phase components, the user device 104 may further utilize a log-transform to transform the magnitude components of the frequency of the reflected ultrasonic signal 122A. For instance, due to the high-dynamic range of the magnitude components of the frequency of the reflected ultrasonic signal 122A, and because the amount of reflection that occurs from movement 120 of the user 106 is relatively small (may appear similar to noise), the log-transform may transform the magnitude components using a log-transforming into a larger range. After applying a log-transform to the magnitude components, the change in magnitude caused by the reflection of the continuous ultrasonic signal 114A off of the moving user 106 will be more easily identifiable.

Initially, the user device 104 may be in a presence-detection state 118 to detect presence (e.g., movement) of the user 106 in the environment 102. Upon detecting movement of the user 106, the user device 104 may alter an ultrasonic signal emission level for a configurable period of time. For instance, if the user device 104 detects motion, the user device 104 may perform one or more of a zero-emission process (or polling process). In the zero-emission process, the user device 104 may, upon detecting motion, shut down the ultrasound emission of the continuous ultrasonic signal 114A for a configurable period of time. For instance, ultrasound emission may be shut down for 30 seconds once motion is detected. Once the period of time elapses, the user device 104 may return to emitting the continuous ultrasonic signals 114A into the environment 102 to detect motion.

During these polling periods where presence detect is no longer being performed by the user device 104, the use device 104 may transition into a proximity-sensing state 124 in which the user device 104 emits pulsed ultrasonic signals 114B according to a duty cycle. For example, the loudspeaker 110 may emit pulsed ultrasonic signals 114B, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.).

Upon being emitted, the pulsed ultrasonic signals 114B will generally reflect off of objects in the home 102. The user device 104 may use the microphone(s) 112 to generate audio data representing the reflected ultrasonic signals 122B. Generally, the audio data (or other type of data, such as energy data) may represent reflected ultrasonic signals 122B of individual pulsed ultrasonic signals 114B in respective frames, or periods of time in which reflections from one of the pulsed ultrasonic signals 114B are primarily or entirely represented in the audio data. The frames may be represented in data in that an individual frame begins before, during, or right after a pulsed ultrasonic signal 114B is emitted, continues during the "off" cycle when reflected ultrasonic signals 122B are reflecting off objects and back towards the user device 104, and ends in the off cycle and before a next pulsed ultrasonic signal 114B is going to be emitted. In this way, a frame of the audio data represents a reflected ultrasonic signal 122B corresponding to one pulsed ultrasonic signal 114B, and represents energy measurements for the reflected ultrasonic signals 122B when received back at the device 104.

The user device 104 may detect changes in energy of reflected ultrasonic signals 122B across frames representing the reflections of the pulsed ultrasonic signals 114B. For instance, the user device 104 may analyze the audio data on a frame-by-frame basis and determine energy data for each frame representing energy measurements for each reflected ultrasonic signal 122B. The energy measurements may represent the energy of a reflected ultrasonic signal 122B, such as a strength of the reflected ultrasonic signal 122B, when that signal 122B is received by the microphone 112 of the user device 104. The audio data may represent the reflected ultrasonic signals 122B as continuous-time signals that have a varying amplitude over time. Generally, the energy of a signal corresponds or is correlated to the total magnitude of the signal, and the user device 104 may determine energy values for the reflected signals using various algorithms and the audio data as described below. In addition to determining the energy values, the user device 104 may identify and track the times at which the reflected ultrasonic signals 122B were received back at the device 104 and map those times to the respective energy values for that reflected ultrasonic signal 122B. Thus, the user device 104 determines the ToF values for reflected ultrasonic signals 122B, and maps those ToF values to the energy values for the reflected ultrasonic signals 122B.

The user device 104 may determine a movement direction and proximity of the user 106 relative to the user device 104. For instance, the user device 104 may compare the energy measurements and ToF values for reflected ultrasonic signals 122B across multiple frames, such as frames that represent two pulsed ultrasonic signals 114B that were emitted in sequence with each other. Stated otherwise, the reflected ultrasonic signals 122B that have the same, or similar, ToF and/or energy measurements in sequential frames are likely bouncing off the same objects because the difference in time across frames is on the order of milliseconds. Based on that comparison, the user device 104 may determine which of the reflected ultrasonic signals 122B had the largest change in energy across the frames. A change in energy indicates a change in the distance between the device 104 and the object off which the reflected ultrasonic signal 122B is reflecting. Thus, the largest change in energy values across frames will correspond to the largest moving object in the environment, such as the user 106. In this way, the user device 104 may determine that the user 106 is moving in the home 102.

Further, the user device 104 may continue to track the movement of the user 106 in the home environment 102. For instance, the user device 104 may continue to emit pulsed ultrasonic signals 114B, generate new frames of audio data, and determine new ToF values and energy measurement changes for the user 106. The user device 104 can determine whether the ToF values are increasing, indicating that the user 106 is moving away from the device 104 (as is the case in this example), or decreasing which indicates that the user 106 is moving towards the device 104. If the user device 104 has multiple microphones 112, the user device 104 may be able to determine a direction of movement of the user 106 relative to the device beyond simply determining that the user 106 is moving towards or away from the device 104.

In some instances, the user device 104 may perform various operations based on the determinations made herein, such as a proximity/distance of the user 106 relative to the device, whether the user 106 is moving towards or away from the device 104, and/or whether multiple users are in a room. For instance, the user device 104 may cause various secondary devices 108 to turn on or off (e.g., lights, television, security alarm, etc.), optimize the output of music data to create auditory "sweet spots" for the user 106 as they move through the environment 102, perform more effective beamforming techniques based on the location and/or movement of the user 106, and so forth. In one illustrative example, the user device 104 may determine whether the user 106 is within a threshold distance (e.g., 3 feet, 4 feet, etc.) to the user device 104 that has a display. If the user 106 is within the threshold distance, the user device 104 may cause content to be presented on the display, or change a size of the content being displayed. For example, if the user 106 moves within the threshold distance of the user device 104, the device 104 may change the font size of text or size of images, change the brightness of content on the display, change what is presented on the display, start outputting content on the display (e.g., show the time or weather), and/or perform other operations.

FIG. 2 illustrates an example component diagram 200 of a user device 104. Generally, the user device 104 may comprise any type of device, such as a fixed computing device (e.g., light switch, appliance, etc.), a display device (e.g., television, screen interface device, etc.) and/or a portable or mobile device such as voice-controlled devices, smartphones, tablet computers, media players, personal computers, wearable devices, various types of accessories, and so forth.

The user device 104 may include one or more processors 202 configured to execute various computer-executable instructions stored on the user device 104. Further, the user device 104 may include one or more loudspeakers 110 positioned at one or more locations on the user device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the user device 104.

The user device 104 may further include one or more microphones 112 (and may be a microphone array) that may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The user device 104 may further include computer-readable media 204 that may be used to store any number of software and/or hardware components that are executable by the processor(s) 202. Software components stored in the computer-readable media 204 may include an operating system 206 that is configured to manage hardware and services within and coupled to the user device 104. The computer-readable media may store a speech-recognition component 208 that, when executed by the processor(s) 202, perform speech-recognition on processed audio signal(s) to identify one or more voice commands represented therein. For instance, the speech-recognition component 208 may convert the audio signals into text data using automatic-speech recognition (ASR), and determine an intent for voice commands of the user 106 using natural-language understanding (NLU) on the text data. Thereafter, a command processor, stored in the computer-readable media 204 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 204 may further store an ultrasonic front end 210 that includes various components, including a signal-generation component 212 that, when executed by the processor(s) 202 generate(s) audio signals/data that represent sound to be output by the loudspeaker(s) 110. The signal-generation component 212 may, for example, generate audio data representing ultrasonic signals that are output by the loudspeaker(s) 110 at a frequency that is above the audible range of humans. The signal-generation component 212 may generate ultrasonic signals at various power levels depending on, for example, a size of a room that the user device 104 is in. Further, the signal-generation component 212 may generate ultrasonic signals that are converted into sound by the loudspeaker(s) 110 according to various timing implementations, such as a pulsed sound, a periodically pulsed sound, etc. The signal-generation component 212 may generate pulsed ultrasonic signals 114 according to various waveforms, such as various duty cycles of on or off. The signal-generation component 212 may generate ultrasonic signals having different waveforms that are optimized for the applications that are using the loudspeaker 110.

The computer-readable media 204 may further store a calibration component 214 configured to, when executed by the processor(s) 202, determine audio characteristics of an environment of the user device 104 and/or frequencies at which to output sound by the loudspeaker(s) 110. In some examples, the calibration component 214 may cause the signal-generation component 212 to generate audio data representing a calibration tone, such as an ultrasonic sweep signal, to determine audio characteristics of the environment of the user device 104. The calibration component 214 may perform device calibration to determine an optimal frequency range for ultrasonic signals to be emitted by the loudspeaker(s) 110 into the environment. In some examples, the calibration component 214 may cause the signal-generation component 212 to generate an ultrasonic sweep signal that, when converted into sound by the loudspeaker(s) 110, emits a sound over a period of time at a range of ultrasonic frequencies (e.g., 32 kHz-40 kHz). The calibration component 214 may also activate at least one microphone 112 to generate audio data representing the ultrasonic sweep signal, and determine an optimal frequency range/bin for the environment. For instance, the calibration component 214 may analyze various frequency ranges included in the total frequency range of the ultrasonic sweep signal and determine signal-to-noise (SNR) values for one or more frequency ranges. The calibration component 214 may determine which sub-frequency range in the total frequency range of the ultrasonic sweep signal has the best SNR value. In some examples, the calibration component 214 may utilize the ultrasonic sweep signal upon installation of the user device 104, after detecting movement, or the end of movement, using a sensor of the user device 104, and/or periodically in order to determine an optimal frequency at which to emit ultrasonic signals into an environment of the user device 104.

The calibration component 214 may generate calibration data 236, such as environment calibration data and/or device calibration data. The calibration data 326 may indicate optimal or preferred signal characteristics for the user device 104 and/or the environment in which the user device 104 is located. For instance, the calibration data 326 may indicate optimal carrier frequencies for emitting the ultrasonic signals (e.g., highest SNR ratios or otherwise best signal performance). The optimal carrier frequencies may be determined for different frequency ranges or bandwidths that may be utilized by the different applications 222. Further, the calibration data 236 may indicate optimal gain values for the environment and/or device as well for improved performance. In some instances, the calibration data 236 may be used to determine different optimal carrier frequencies and/or emission characteristics for the different ultrasonic applications 222 and the different waveforms use.

The computer-readable media 204 may further include a signal-processing component 216 that, when executed by the processor(s) 202, perform various operations for processing audio data/signals generated by the microphone(s) 112. For example, the signal-processing component 216 may include components to perform low-pass filtering and/or high-pass filtering to ensure that speech and other sounds in the spectrum region of the ultrasonic signal does not affect baseband processing on received audio data 238 generated using the microphone 112. For instance, the signal-processing component 216 may performing high-pass filtering for the audio data received in each audio channel for respective microphones 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 216 may perform baseband carrier shifts (e.g., at 96 kHz) to shift or modulate the audio signal back to baseband frequency from the carrier frequency (e.g., 46 kHz, 21 kHz, 2 kHz, etc.). Additionally, the signal-processing component 216 may perform low-pass filtering for each audio signal generated by each microphone 112 after the baseband carrier shift to remove signals from the audio signals that are higher than a certain cutoff frequency that is higher than audio signals representing the ultrasonic signal (e.g., a cutoff frequency of than 30 kHz, 33 kHz, 35 kHz, and/or any other cutoff frequency higher than the ultrasonic signal frequency range).

In some examples, the signal-processing component 216 may perform integer down sampling, such as digital sampling, to remove certain samples from the audio signals. For example, the signal-processing component 216 may perform any form of digital down sampling or decimation to reduce the sampling rate of the audio signals, such as down sampling at a rate of 2 kHz (or another appropriate frequency). In this way, the signal-processing component 216 may produce an approximation or representation of the audio signals generated by the microphones 112, but at a lower frequency rate. After down sampling the audio signals, the signal-processing component 216 may perform various signal processing, such as windowing, Fourier Transformations, and/or logarithmic transformations. For example, the signal-processing component 216 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 216 may utilize any type of windowing function on the audio data, such as the Hanning Window, the Hamming Window, Blackman window, etc. Additionally, the signal-processing component 216 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

Additionally, the ultrasonic front end 210 may include an orchestration component 220 that coordinates between the various components and applications in the ultrasonic front end 210. For instance, the orchestration component 220 may perform some or all of the techniques for coordinating the mutually-exclusive emission of ultrasonic signals between ultrasonic applications 222, and scheduling regular intervals for emissions on behalf of different ultrasonic applications 222 as described herein.

In some examples, the orchestration component 220 may coordinate between ultrasonic applications 222 using coordination logic 242. For example, the orchestration component 220 may determine or receive priorities assigned to the different ultrasonic applications 222. In some examples, the user 106 may interface with the user device 104 and/or a backend system to provide the priorities that indicate which ultrasonic application 222 is to emit or output ultrasonic signals when multiple ultrasonic applications 222 are competing for, or requesting, use of the loudspeaker 110 at a same time. For instance, the user 106 may enroll for a heartbeat-monitoring application 232 to determine or monitor heartbeat related parameters of the enrolled user. Further, the user 106 may enroll or request that a temperature/humidity sensing application 230 determine a temperature or humidity in an environment of the enrolled user. The user 106 may further specify that the heartbeat-monitoring application 232 has a higher priority than the temperature/humidity sensing application 230 for using the loudspeaker 110 to emit ultrasonic signals based on the importance of the functions being performed by the applications. In some instances, the user device 104 itself may determine the priorities based on the applications, and/or a backend system or manufacturer of the user device 104 may configure the user device with the priorities that are in the coordination logic 242.

In some instances, the coordination logic 242 may be used by the orchestration component 220 to determine whether various events of the ultrasonic applications 222 indicate that other ultrasonic applications 222 are to begin emitting ultrasonic signals 114 using the loudspeaker 110. For instance, an ultrasonic application 222 that is emitting ultrasonic signals may be a presence-detection application 224 configured to detect the presence of a user in an environment. The presence-detection application 224 may determine an event, such as movement of a user, and the orchestration component 220 may then determine that a lower priority ultrasonic application 222 that desires or requests to use the loudspeaker 110 may begin emitting ultrasonic signals 114 using the loudspeaker 110. The events may comprise different types of events, such as ends of times in schedules according to which ultrasonic applications 222 emit ultrasonic signals 114, or events associated with the functions that the ultrasonic applications 222 perform. In addition to presence detection, the events may include proximity sensing (e.g., within threshold distances, particular distances detected, etc.), detecting threshold or desired temperatures, humidity, etc., detecting threshold or desired heartbeats, and so forth. The events detected by the ultrasonic application 222 currently operating and using the loudspeaker may cause the orchestration component 220 to stop the current ultrasonic application 220 from operating or emitting signals and may allow or cause a different ultrasonic application 222 to operate and use the loudspeaker 110. In some examples, the orchestration component 222 may (at least temporarily) change priorities of the ultrasonic applications 222 that desired to use the loudspeaker 110 based on one or more events being detected.

In some instances, the coordination logic 242 may be used by the orchestration component 220 to identify schedules according to which the different ultrasonic applications 222 output ultrasonic signals, or otherwise perform their functionality. For example, a user 106 may enroll for use of a sleep-monitoring application 228 to determine sleep related parameters of an enrolled user, such as restlessness of the user 106 during sleeping or other parameters to determine a quality of sleep of the user 106. The sleep-monitoring application 228 may emit ultrasonic signals periodically or otherwise according to the schedule. In such examples, the sleep-monitoring application 228 may be given priority over other ultrasonic applications 222 at predefined times in the schedule that the sleep-monitoring application 228 is to operation to determine sleep parameters on behalf of the enrolled user. In such examples, the orchestration component 220 may stop a different ultrasonic application 222 from using the loudspeaker 110 and/or microphone 112 to allow the sleep-monitoring application 228 to operate according to the schedule. Thus, the schedules may temporarily change the priority of ultrasonic applications 222.

The user device may run, execute, or support various ultrasonic applications 222 that use the loudspeaker(s) 110 and microphone(s) 112 to perform different functions or use cases. For instance, the ultrasonic applications 222 may include a presence-detection application 224 configured to detect presence (movement) of a user 106. The presence-detection application 224 may receive magnitude components and phase components that represent the frequency components (magnitude and phase) of the audio signals that represent reflected signals that correspond to the ultrasonic signal from the signal-processing component 216. Generally, the magnitude components and phase components may be complex numbers that represent the audio signals at each frequency. Thus, the magnitude components and phase components may represent frequency content for audio signals from each audio channel generated by the microphone 112 after various digital processing has been performed on the audio signals by the signal-processing component 216. The magnitude components may be represented as logarithmic values (dB), and the phase components may be represented by radian and/or degree values. The signal-processing component 216 may generate magnitude components and phase components representing audio signals generated by two or more microphones in the microphone 112 over a period of time (e.g., 8 seconds).

The presence-detection application 224 may further extract magnitude feature data and phase feature data from the magnitude and phase components. The presence-detection application 224 may perform various operations for normalizing and stacking features of the magnitude components and phase components for each audio channel from the microphones 112. For example, the presence-detection application 224 may receive the complex numbers (e.g., magnitude components and phase components) and remove the first order statistics. Further, the presence-detection application 224 may perform feature stacking to stack the magnitude components across N time intervals to create magnitude feature data, and stack the phase components to create phase feature data. In some examples, the presence-detection application 224 may create the phase feature data may determine differences between phase components of the different audio channel paths from the microphones 112.

In some examples, the magnitude feature data and the phase feature data may generally represent binned frequency features over time, such as 1 dimensional binned frequency features over time that represent reflections of the ultrasonic signal. In various examples, the phase feature data may comprise phase differences between multiple microphones, such as a phase difference between phase components of audio data generated at least in part by different microphones 112.

The presence-detection application 224 may further input the magnitude feature data and the phase feature data into one or more machine-learning model(s) in order to classify the magnitude feature data and/or phase feature data as indicating movement of an object in the environment, a direction of the movement, and/or a number of objects moving in the environment. The machine-learning (ML) model(s) may comprise any type of ML model(s) (e.g., neural networks, linear regression, decision tree, Naïve Bayes, etc.) that may be trained to receive magnitude feature data and phase feature data as inputs, and determine outputs indicating whether the magnitude feature data and phase feature data represent movement of an object, a direction of that movement, and/or a number of objects moving.

The presence-detection application 224 may further perform various techniques to train the ML model(s). For instance, an ML model(s), such as a neural network, may be trained with training data (e.g., magnitude feature data and phase feature data) that is tagged as no movement (or minor movement), and training data tagged as movement (or major movement such as walking). Generally, the training data may comprise feature vectors of magnitudes of reflections of different ultrasonic signals off of objects over a period of time (e.g., windowing and feature stacking to represent the period of time). In this way, the ML model(s) may be trained to identify input feature vector as representing reflections of ultrasonic signals that reflected off a moving object, or that did not reflect off a moving object.

The presence-detection application 224 may further receive or determine classification results data by analyzing the magnitude feature data and the phase feature data and output confidence scores associated with detecting movement of an object in the environment of the user device 104. The presence-detection application 224 may be configured to determine if those confidence scores are above or below threshold values to indicate movement or presence.

The ultrasonic applications may further include a proximity-sensing application 226 configured to determine a distance, or proximity, of a user 106 relative to the user device 104. The proximity-sensing application 226 may cause the loudspeaker 110 to emit pulsed ultrasonic signals 114B into the environment, and use the microphone to generate audio data 238 representing the reflected ultrasonic signals 122B. The proximity-sensing application 226 may additionally perform various operations for processing audio data 238 to determine energy data 240 that represents energy measurements for reflections 122 of the pulsed ultrasonic signals 114. The audio data 238 may represent the reflection signals 122B as continuous-time signals that have a varying amplitude over time. Generally, the energy of a signal corresponds or is correlated to the total magnitude of the signal, and the proximity-sensing application 226 may determine energy values for the reflected signals using various algorithms and the audio data 238 as described below. In one example, to determine the energy data 240 using the audio data 238, the proximity-sensing application 226 may determine the root-mean-square energy (RMSE) values for the signals. The RMSE values may be placed or grouped into "bins" that represent energy measurements for reflections 122 receives over time. In another example, the proximity-sensing application 226 may use a Hilbert transform, or another transform that determines higher-order differences in the frames to compute the energy of fluctuations.

The proximity-sensing application 226 may perform various operations for signals that represent targets that are static or stationary, or "noise" signals. For instance, the proximity-sensing application 226 may apply a threshold to remove a portion of the unwanted energy data 240, such as 90% of the unwanted energy data 240 being removed. In this way, the proximity-sensing application 226 may isolate the energy data 240 that represents the largest changes in energy measurements between frames.

The proximity-sensing application 226 may perform various operations for determining the distance between the user device 104 and a user 106. For instance, the proximity-sensing application 226 may use ToF values (or roundtrip time) based on when the pulsed ultrasonic signals 114B are emitted and when the reflected ultrasonic signals 122B are received. The ToF values are generally representative of distance with respect to sound signals or waves because the sound waves move at the speed of sound (e.g., 343 m/s), and ToF and speed of sound can be used to easily calculate distance. Thus, the proximity-sensing application 226 may use Equation 1, shown below, to determine distances between the user device 104 and the user 106, wherein "d" is the distance between the user 106 and the user device 104, "c" is the speed of sound, and "t" is the ToF of the signal:

$$d = c\left(\frac{t}{2}\right) \qquad \text{Equation 1}$$

Thus, using these ToF values, the proximity-sensing application 226 may determine distances for reflected signals in different frames that have been reflected off a moving user 106. The proximity-sensing application 226 may store the distances in the distance data of the data store. Using different distances tracked over various frames and period of time, the proximity-sensing application 226 can determine a movement direction of the user 106 (e.g., towards the device, away from the device, substantially parallel with the device, around the device, etc.). Further, the proximity-sensing application 226 may determine whether the user 106 is within a threshold proximity or distance to the user device 104.

The ultrasonic applications 222 may further include a sleep-monitoring application 228 configured to monitor sleep of a user 106. For instance, the sleep-monitoring application 228 may emit ultrasonic signals having a particular waveform, and may analyze the resulting audio data 238 representing the reflections off the user 106 to detect respiration, distance, and movements of the user 106 as the user is sleeping. That data can then be used to provide users 106 with information around the quality of their sleep. In some instances, the sleep-monitoring application 228 may be configured to emit ultrasonic signals at night or when the user 106 is sleeping, and emit the ultrasonic signals according to predefined schedule (periodically). In some instances, the waveform of the ultrasonic signal emitted on behalf of the sleep-monitoring application 228 may be a FMCW signal and may have a bandwidth of approximately 4 kHz.

The ultrasonic applications 222 may further include a temperature and humidity application 230 configured to monitor temperature and/or humidity in an environment of a user 106. The temperature and humidity application 230 may emit ultrasonic signals having a waveform of a Zadoff-Chu sequence that is used to collect information used to determine temperature and/or humidity in the environment being monitored.

The ultrasonic applications 222 may further include a heartbeat-monitoring application 232 configured to monitor heartbeats (and potentially other vital signs) of users 106. The heartbeat-monitoring application 232 may emit ultrasonic signals having a waveform of a FMCW signal that is used to collect information used to check the heartbeat of a user 106.

The computer-readable media 204 may further include an operations component 246 that, when executed by the processor(s) 202, perform various operations based on the determinations made herein, such as a proximity/distance of the user 106 relative to the device 104, whether the user 106 is moving towards or away from the device 104, and/or whether multiple users 106 are in a room. For instance, the user device 104 may cause various secondary devices to turn on or off (e.g., lights, television, security alarm, etc.), optimize the output of music data to create auditory "sweet spots" for the user 106 as they move through the room, perform more effective beamforming techniques based on the location and/or movement of the user 106, and so forth. In one illustrative example, the user device 104 may determine whether a user is within a threshold distance (e.g., 3 feet, 4 feet, etc.) to a user device 104 that has a display. If the user 106 is within the threshold distance, the user device 104 may cause content to be presented on the display, or change a size of the content being displayed. For example, if a user 106 moves within the threshold distance of the user device 104, the device 104 may change the font size of text or size of images, change the brightness of content on the display, change what is presented on the display, start outputting content on the display (e.g., show the time or weather), and/or perform other operations.

The computer-readable media 204 may further store a context engine 218 configured to, when executed by the processor(s) 202, aggregate and communicate various contextual information between components. In some instances, the context engine 218 may manage the polling techniques performed during presence detection and proximity sensing as discussed further below.

The computer-readable media 204 may further store an audio-player component 248 configured to, when executed by the processor(s) 202, cause the loudspeakers 110 to play audio such as music songs or other audio files. The audio-player component 248 may cause audio data to be provided to the loudspeaker(s) 110 to be converted into sound. In some examples, prior to providing the audio data to the loudspeaker(s) 110, the audio data may be stored in an audio-data buffer. In such examples, the signal-generation component 212 (or another component) may analyze the audio data stored in the audio-data buffer and determine how to mix the audio data, such as music data, with audio data representing the ultrasonic signal such that the output sound does not experience saturation.

The user device 104 may comprise any type of portable and/or fixed device and include one or more input devices 250 and output devices 252. The input devices 250 may include a keyboard, keypad, lights, mouse, touch screen, joystick, control buttons, etc. The output devices 252 may include a display, a light element (e.g., LED), a vibrator to create haptic sensations, or the like. In some implementations, one or more loudspeakers 110 may function as output devices 252 to output audio sounds.

The user device 104 may have one or more network interfaces 254 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 254 may enable communications between the user device 104 and the secondary devices 108, as well as other networked devices. Such network interface(s) can include one or more network interface controllers (NICs) or other types of transceiver devices to send and receive communications over a network.

For instance, the network interface(s) 254 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 254 may include a wide area network (WAN) component to enable communication over a wide area network. The networks may represent an array of wired networks, wireless networks, such as WiFi, or combinations thereof.

Figure 3:
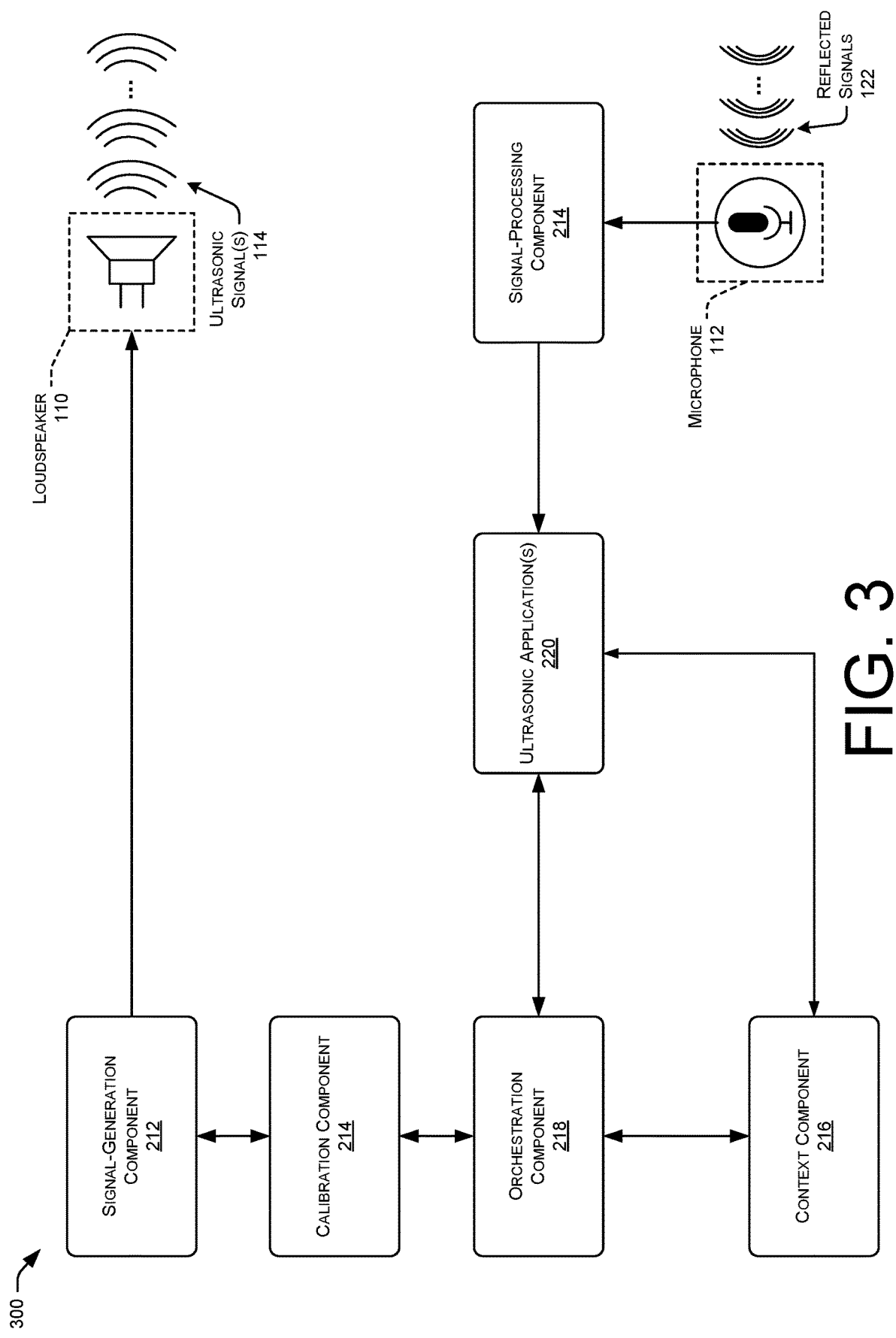
FIG. 3 illustrates an example high-level process for an ultrasonic front end to generate and emit ultrasonic signals into an environment, and analyze audio data representing reflections of the ultrasonic signal off objects in the environment.

FIG. 3 illustrates an example high-level process for an ultrasonic front end 210 to generate and emit ultrasonic signals 114 into an environment, and analyze audio data 238 representing reflection signals 122 of the ultrasonic signal 114 off objects in the environment.

The calibration component 214 may initially determine device and/or environment calibration data. In some examples, the calibration component 214 may cause the signal-generation component 212 to generate audio data representing a calibration tone, such as an ultrasonic sweep signal, to determine audio characteristics of the environment of the user device 104. The calibration component 214 may perform device calibration to determine an optimal frequency range for ultrasonic signals to be emitted by the loudspeaker(s) 110 into the environment. For instance, the calibration component 214 may analyze various frequency ranges included in the sweep frequency range of the ultrasonic sweep signal and determine signal-to-noise (SNR) values for one or more frequency ranges. The calibration component 214 may determine which sub-frequency range in the sweep frequency range of the ultrasonic sweep signal has the best SNR value. Further, the calibration component 214 may generate, at least periodically, background noise audio data that represents background noise in the environment that may interfere with analysis of audio data that represents the ultrasonic signal. In this way, means subtraction may be performed to remove the unwanted background noise from the audio data representing the ultrasonic signal.

The calibration component 214 may provide the signal-generation component 212 with an indication of optimized signal data. For example, the calibration component 214 may determine, based at least partly on the SNR values for frequency ranges of audio data representing the ultrasonic sweep signal, a frequency and/or frequency range with a high, or the highest, SNR value for the environment. In some instances, the orchestration component 220 may determine the ultrasonic application 222 that is to emit an ultrasonic signal 114, and provide information about the signal to be emitted for the application 222 (e.g., gain for the application 222, optimal carrier frequency for the application 222, optimal waveform for the application 222, etc.) Additionally, the optimized signal data may indicate an optimized power at which to emit the ultrasonic signal 114. For example, the calibration component 214 may determine a size of the room using the sweep signal, and then determine a power that is appropriate for the room. Larger rooms may require an ultrasonic signal that is powered at a higher power than smaller rooms. Further, the optimized signal data may indicate whether the ultrasonic signal should be emitted continuously, periodically, pulsed, etc. The signal-generation component 212 may cause the loudspeaker(s) 110 to output an ultrasonic signal 114 that is optimized according to the optimized signal data received from the calibration component 214.

One or more microphones 112 may generate and provide audio data 238 to the signal-processing component 214. The signal-processing component 214 may perform various processing techniques on the audio data 238, such as applying high-pass and/or low-pass filters to remove unwanted frequencies, and down-sampling the audio data to a lower sampling or frequency for baseband processing (generally, the audio data that represents the movement of the user is at a lower frequency range than the transmission frequency range). After processing the audio data 238, the pre-processing unit may provide one or more of the ultrasonic applications 222 with the resulting data such that each application does not need to individually process the audio data 238 before further use or analysis.

One or more of the ultrasonic applications 222 may then use the processed audio data for their respective functions. As noted above, the ultrasonic applications 222 may emit ultrasonic signals 114 having different waveforms that are optimal for collecting the data used by those applications. For instance, the heartbeat-detection application 232 may utilize a frequency modulated continuous wave (FMCW) waveform, the presence-detection application 224 may utilize a continuous single-tone waveform (sinusoidal, Gaussian, etc.), and the proximity-sensing application 226 may utilize a pulsed tone waveform. In some instances, multiple ultrasonic applications 222 may be configured to utilize data generated from ultrasonic signal reflections 122 of a same waveform. As an example, a sleep-monitoring application 228 and a heartbeat-detection application 232 may both utilize audio data that represents reflected signals 122 having the FMCW waveform.

Figure 4:
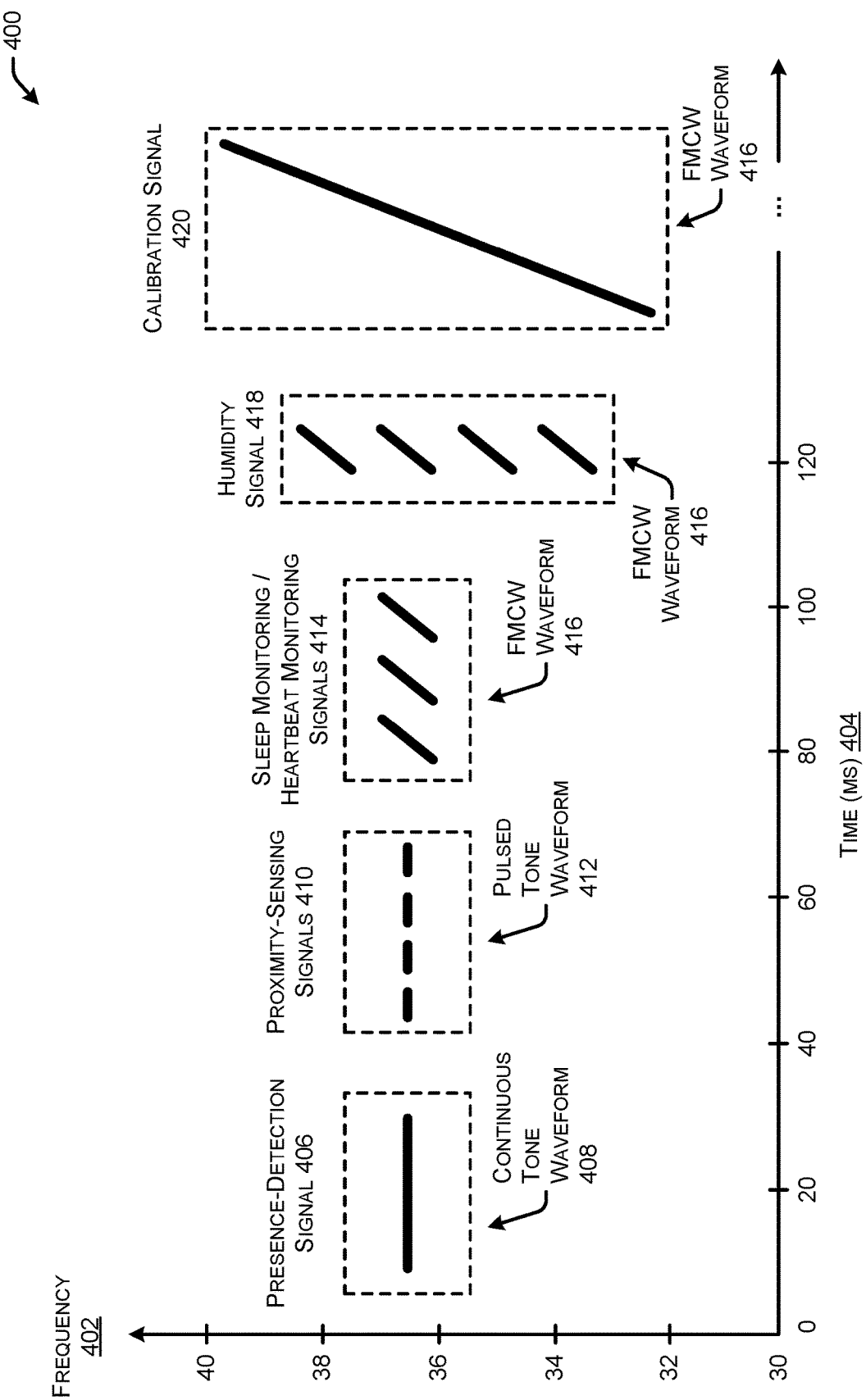
FIG. 4 illustrates an example diagram depicting different waveforms for ultrasonic signals that are emitted on behalf of various ultrasonic applications.

FIG. 4 illustrates an example diagram 400 depicting different waveforms for ultrasonic signals 114 that are emitted on behalf of various ultrasonic applications 222. As shown, a presence-detection signal 406 may be emitted on behalf of the presence-detection application 224 and may be emitted using a continuous tone waveform 408 over time 402. The continuous tone waveform 408 may generally be emitted at a same, or substantially the same, frequency for the duration of the signal. Further, the loudspeaker 110 may be used to emit proximity-sensing signals 410 on behalf of a proximity-sensing application 226 that may be emitted using a pulsed tone waveform 412. The pulsed tone waveform 412 may comprise short bursts of ultrasonic sound followed by quiet periods.

Additionally, the loudspeaker 110 may be used to emit sleep monitoring and/or heartbeat monitoring signals 414 on behalf of a sleep-monitoring application 228 and/or a heartbeat-monitoring application 232 and may be emitted using sequence of FMCW waveforms 416. The FMCW waveform 416 may have a waveform that is continuous and linearly varying frequency over time. For the FMCW waveform 416, the frequency of the transmitted signal steadily increases or decreases with time in a continuous manner. This modulation of the frequency is used to encode information about the target being observed. When the signal reflects off an object and returns to the radar receiver, the frequency shift of the received signal (compared to the transmitted signal) is proportional to the distance and relative velocity of the target. The FMCW waveform 416 may additionally be used as a humidity signal 418, but rather than being a sequence of FMCW waveforms 416 emitted over time, the FMCW waveform 416 may instead be two or more ultrasonic signals emitted in different frequency ranges, but substantially at a same time, as shown for the humidity signal 418. Finally, the diagram 400 illustrates an example calibration signal 420 that may be emitted on behalf of the calibration component 214 and may be emitted as an FMCW waveform 416 that spans over a range of ultrasonic frequencies. As illustrated, the sweep signals of the FMCW waveform 416 for the calibration signal 418 may be output for a period of time (e.g., 500 ms), and ramp up from approximately 32 kHz to 40 kHz. However, these values are merely illustrative and different frequency spans and different emission times may be used.

Generally, the audio data 238 generated using the microphones 112 may represent reflected signals that correspond to the ultrasonic signals represented in FIG. 4, and may have similar or the same waveforms as the signals shown in FIG. 4. The different waveforms may be advantageous for use by the different ultrasonic applications 222, such as carrying or representing information or data used by the different ultrasonic applications 222 for performing the specific functionality of the ultrasonic applications 222.

Figure 5:
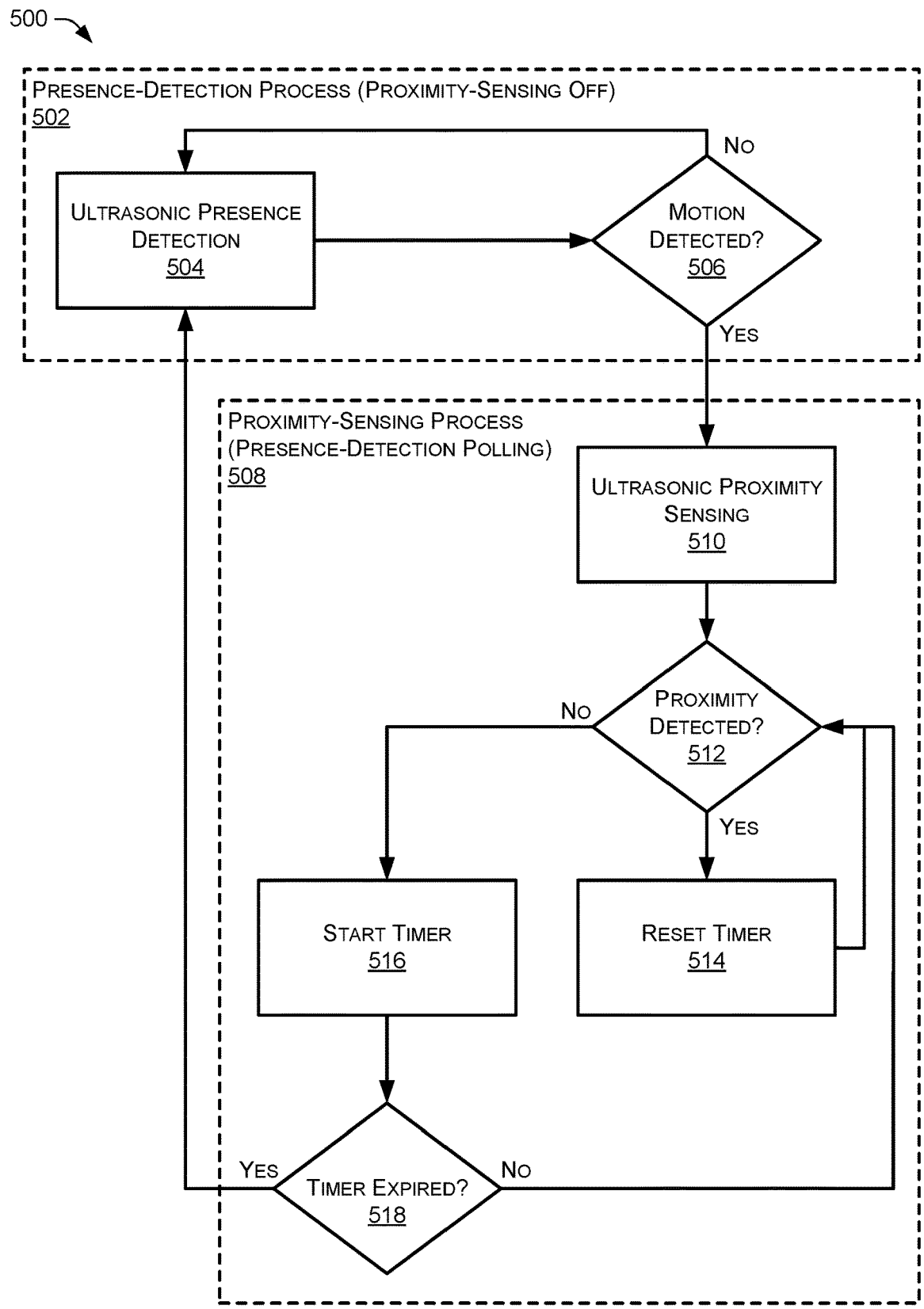
FIG. 5 illustrates a flow diagram of an example process for coordinating a presence-detection process and a proximity-sensing process.

FIG. 5 illustrates a flow diagram 500 of an example for coordinating a presence-detection process 502 and a proximity-sensing process 508. In the presence-detection process 502, ultrasonic proximity-sensing may be turned off and the presence-detection application 224 may be performing ultrasonic presence detection at 504 by utilizing the loudspeaker 110 to emit continuous tone signals, and utilizing the microphone 112 to capture the reflections. At 506, the presence-detection application 224 may determine whether motion has been detected (e.g., analyzing the reflections to identify the Doppler effect caused by movement of a user 106). If no motion is detected, the presence-detection application 224 may continue with ultrasonic presence detection 504.

However, if motion is detected at 506, the ultrasonic front end 210 may exit the presence-detection process 502 and enter a proximity-sensing process 508. In some examples, once motion is detected, the presence-detection application 224 may stop emitting ultrasonic signals for a period of time, or "poll" the emission of the ultrasonic signal. The polling may be for set periods of time, and those periods of time may be configurable based on different embodiments. In one example, if the presence-detection application 224 has been frequently detecting movement, the presence-detection application 224 may increase the period of time during which ultrasonic emissions are stopped or reduced, such as according to a Fibonacci sequence (e.g., 30 seconds, 60 seconds, 120 seconds, etc.).

According to the techniques described herein, the ultrasonic front end 210 may take advantage of these polling periods that the presence-detection application 224 utilizes. For instance, the ultrasonic front end 210 may cause the proximity-sensing application 226 to emit pulsed ultrasonic signals 114B. The proximity-sensing application 226 may determine, at 512, whether the proximity of a user 106 has been detected (e.g., proximity within a threshold distance such as 3 feet, 5 feet, 10 feet, etc.). The proximity-sensing application 226 may cause the loudspeaker 110 to emit pulsed ultrasonic signals 114B into the environment, and detect a change in the energy measurements of the reflections of the pulsed ultrasonic signals off the user 106 caused by the movement of the person relative to the user device 104. The changes in energy measurements, and round trip time-of-flight (ToF) of the signals, can be used to determine distances between the user and the user device. The proximity-sensing application 226 may cause the loudspeaker 110 to emit pulsed ultrasonic signals 114B, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.). The proximity-sensing application 226 may use the microphone 112 to generate data representing reflections of the pulsed ultrasonic signals 114B, and may analyze the data on a frame-by-frame basis to determine that a user is moving around the user device, and a distance between the user and the user device.

In response to determining that proximity is detected at 512, the proximity-sensing application 226 may reset a timer at 514 and continue to check for proximity. The timer may continue to be reset as long as proximity is detected, and may cause the ultrasonic front end 210 to stay in the proximity-sensing process 508 beyond the end of the polling period.

However, if the proximity-sensing application 226 determines that proximity is not detected at 512, the proximity-sensing application 226 may start a timer at 516. If the proximity-sensing application 226 does not detect a user 106 within the threshold proximity before the timer is expired at 518 (e.g., 5 seconds, 10 seconds, etc.), where the timer is no greater than the duration of the polling period left, the proximity-sensing process 508 may be disabled and the ultrasonic front end 210 may transition back into the presence-detection process 502. However, if proximity is detected before the timer expires at 518, the proximity-sensing application 226 may continue to check for proximity at 512.

Figure 6A:
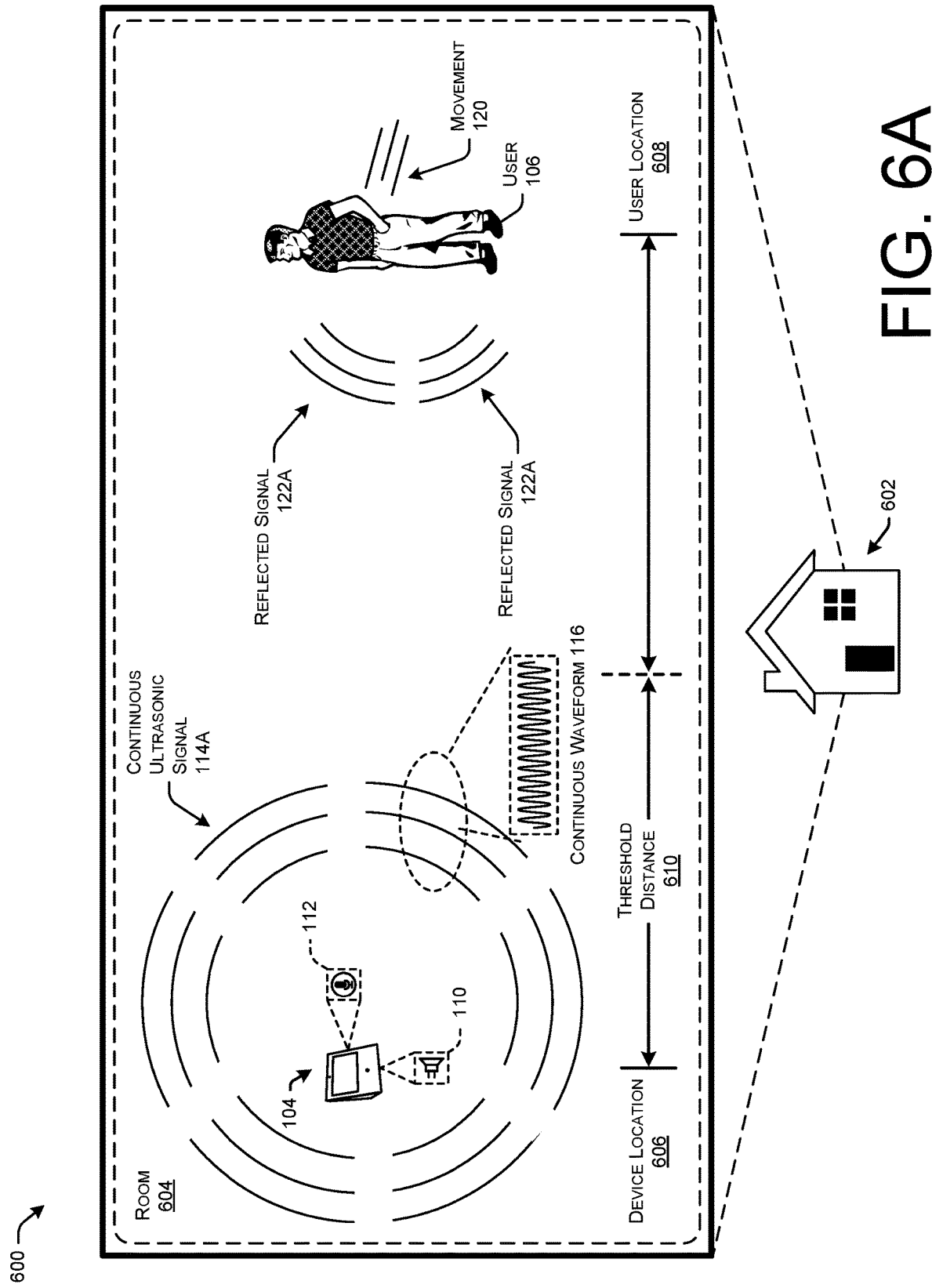
FIG. 6A illustrates an example environment in which a user device uses continuous ultrasonic signals to detect the presence of a user in the environment.

FIG. 6A illustrates an example environment 600 in which a user device 104 uses continuous ultrasonic signals 114A to detect presence of a user 106 in the environment.

As illustrated, the example environment 600 may include a monitored location, such as a home 602, that includes a room 604. The room 604 may include a user 106 and a user device 104. The user device 104 may include a loudspeaker 110 and a microphone 112.

In some examples, the user device 104 may extract feature data representing the frequency of the reflections of the ultrasonic signals 122A (e.g., magnitude feature data, phase feature data, etc.). The user device 104 may determine, based on the magnitude feature data of at least one stream of the audio data representing the reflection of the ultrasonic signal 114A. The presence-detection application 224 of the user device 104 may determine, based on the magnitude feature data, that the user 106 was moving, or detect movement 120 of the user 106, in the room 604. Further, the presence-detection application 224 of the user device 104 may determine, based on a comparison (e.g., difference) between phase feature data of the two audio streams, a direction of movement of the user 106 through the room 604.

As illustrated, the user device 104 may be at a device location 606, and the user may be at a user location 608 that is outside a threshold distance 610 or proximity from the user device 104. Accordingly, the proximity-sensing application 226 may not detect the user 106 within the threshold distance 610.

Figure 6B:
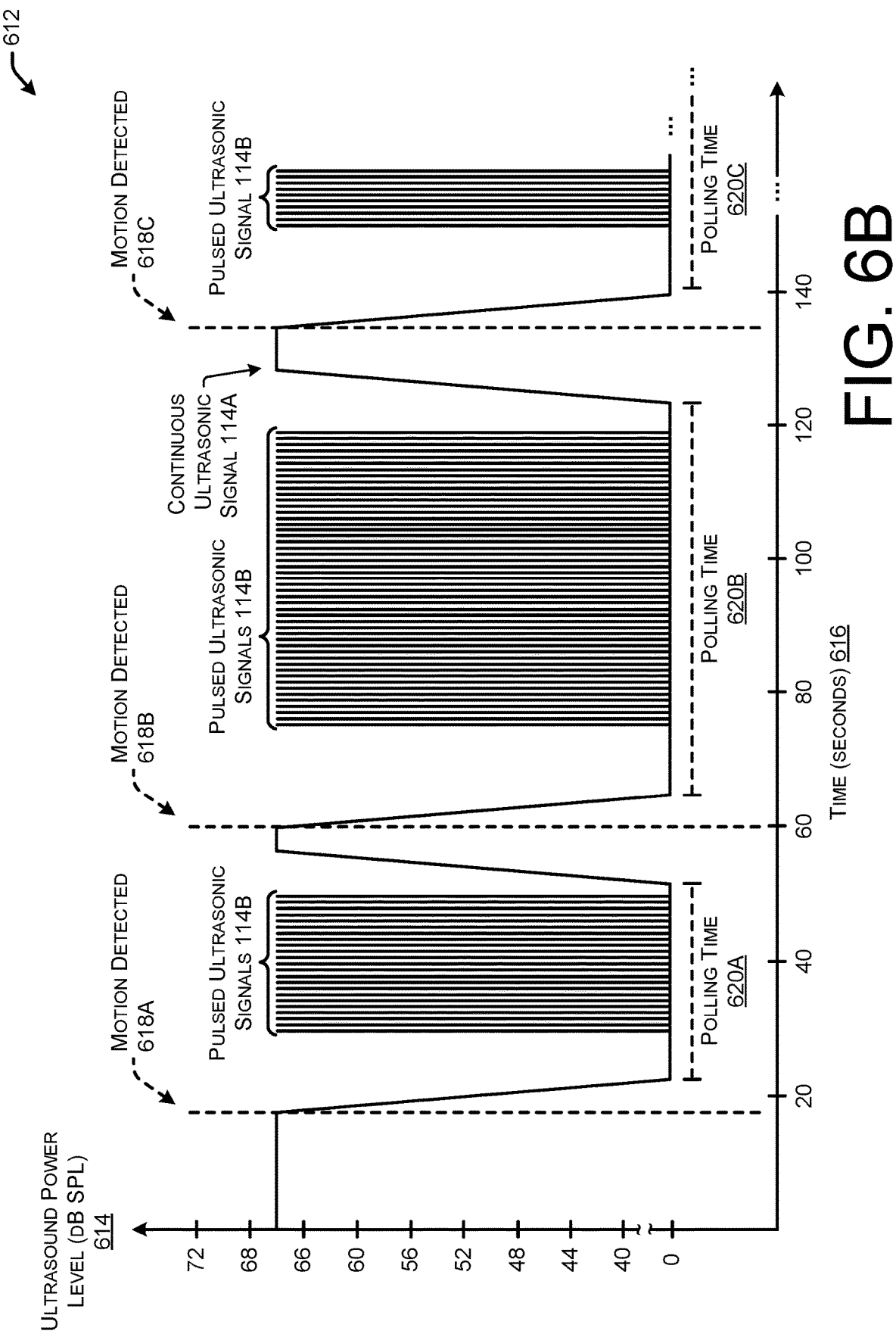
FIG. 6B illustrates an example diagram depicting emissions of continuous ultrasonic signals and pulsed ultrasonic signals over time.

FIG. 6B illustrates an example diagram 612 depicting emissions of continuous ultrasonic signals 114A and pulsed ultrasonic signals 114B over time.

As illustrated, the diagram 612 has an indication of ultrasound power level 614 on the y-axis in dB SPL, and time 616 on the x-axis in seconds. The diagram 612 illustrates points in time where motion is detected 618A-618C, and indications of how the emission power of an ultrasonic signal 114A is turned off for polling times 620A-620C according to the polling process described herein. As shown, each time motion is detected 618 by a user device 104 using an ultrasonic signal 114A, the continuous ultrasonic signal 114A may be turned off. The emission of the ultrasonic signal 114A may be reduced for a predefined, but configurable, polling time 620 (e.g., around 15 seconds in this example). However, this example is merely illustrative, and any other values in terms of emission powers and reduction time 620 may be used, and/or sequences of polling times 620. In some instances, the pulsed ultrasonic signals 114 may additionally undergo a polling process whereby the pulsed ultrasonic signals 114 are also turned off for polling times upon detecting proximity, and the intervals may increase as proximity continues to be detected.

After the reduction time 620A, the ultrasonic signal emission may ramp back up to roughly 67 dB SPL for movement detection. At 618B, the user device 104 may detect motion using the ultrasonic signal 114A and turn off emission for a polling time 620B. As shown, the polling time 620B may be longer than the polling time 620A in this example. For instance, the user device 104 may determine that because motion was detected at 620A, and then again at 620B, it is likely there is continuous movement in the environment 102. In light of this, the user device 104 may determine that a longer polling time 620B may be appropriate as it is likely movement will again be detected once emission is resumed. In some instances, the polling time 620B may be increased if motion is detected within a threshold period of time from when emission of the ultrasonic signal 114 returns to normal operating power (e.g., within 3 seconds, within 5 seconds, within 30 seconds, etc.).

As shown, pulsed ultrasonic signals 114B may be emitted during the polling times 620. However, as shown in FIG. 6A, the user 106 is outside of the threshold distance 610 from the user device 104, so the pulsed ultrasonic signals 114B are only emitted for the timer, and then the user device 104 returns to the presence-detection phase.

Figure 7A:
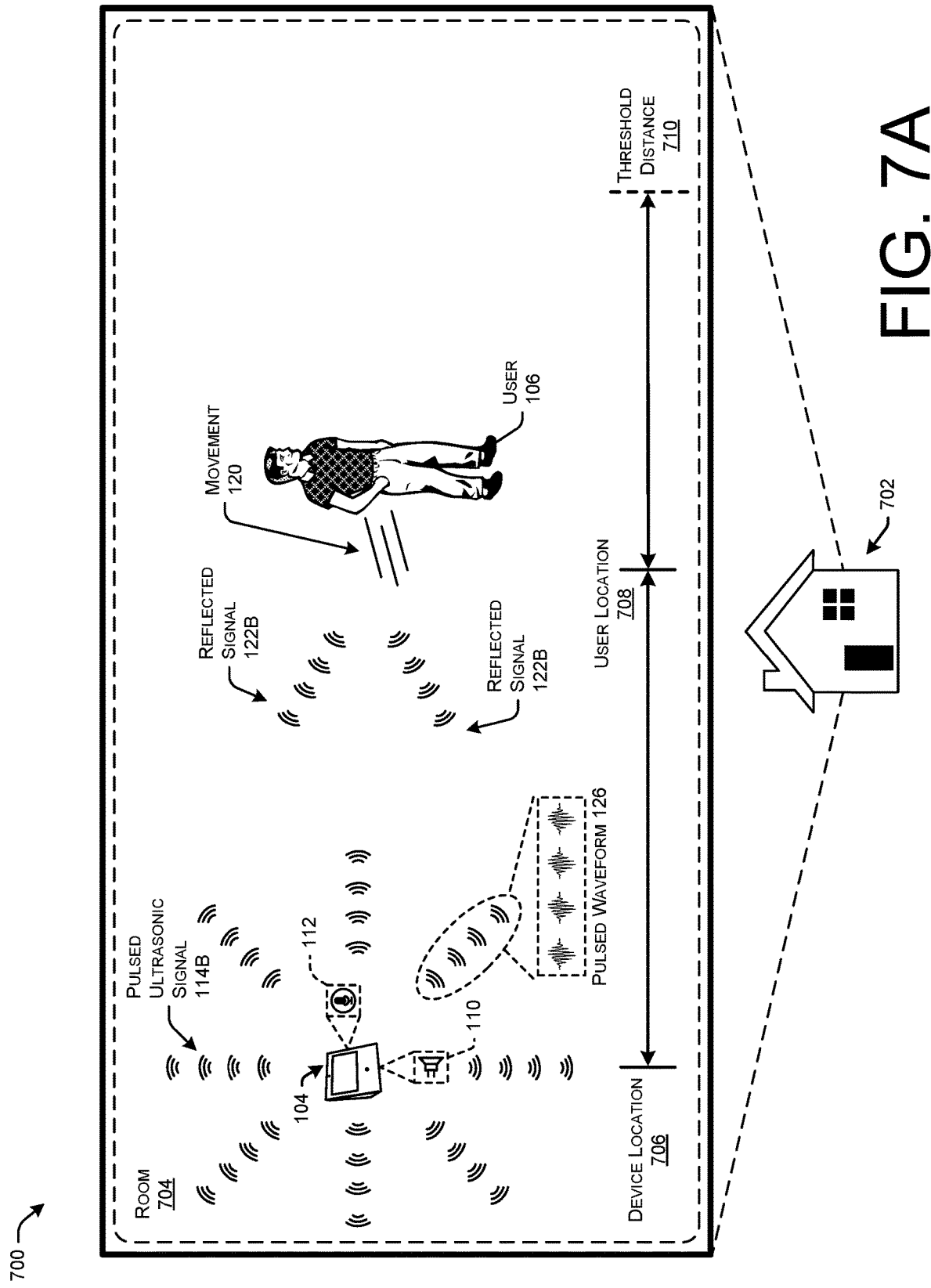
FIG. 7A illustrates an example environment in which a user device uses pulsed ultrasonic signals to detect proximity of a user relative to the user device in the environment.

FIG. 7A illustrates an example environment 700 in which a user device 104 uses pulsed ultrasonic signals 114B to detect proximity of a user 106 relative to the user device 104 in the environment.

As illustrated, the example environment 700 may include a monitored location, such as a home 702, that includes a room 704. The room 704 may include a user 106 and a user device 104. The user device 104 may include a loudspeaker 110 and a microphone 112.

The loudspeaker 110 may transmit/emit pulsed ultrasonic signals 114B into the room 704 periodically, or continuously. The pulsed ultrasonic signals 114B may bounce off objects in the room 704, such as the user 106. In such examples, the pulsed ultrasonic signals 114B may bounce of the user 106 resulting in reflected signals 122B of the ultrasonic signals 114B.

The proximity-sensing application 226 may perform the techniques described above any analyze multiple frames of audio data representing reflections of different pulsed ultrasonic signals 114B to determine that the user 106 is in motion. Further, the proximity-sensing application 226 may determine a distance from a device location 706 and a user location 708 using the ToF values for the reflection signals that reflected off the user 106 and the speed of sound. The proximity-sensing application 226 may determine whether the user 106 is within a threshold distance 710 (e.g., 3 feet, 4 feet, etc.) to the user device 104. If the user 106 is within the threshold distance 710, and particularly for devices 104 that have a display, the user device 104 may perform various operations. In this example, as shown, the proximity-sensing application 226 does determine that the user 106 is within the threshold distance 710, but is moving in a direction away from the user device 104.

Figure 7B:
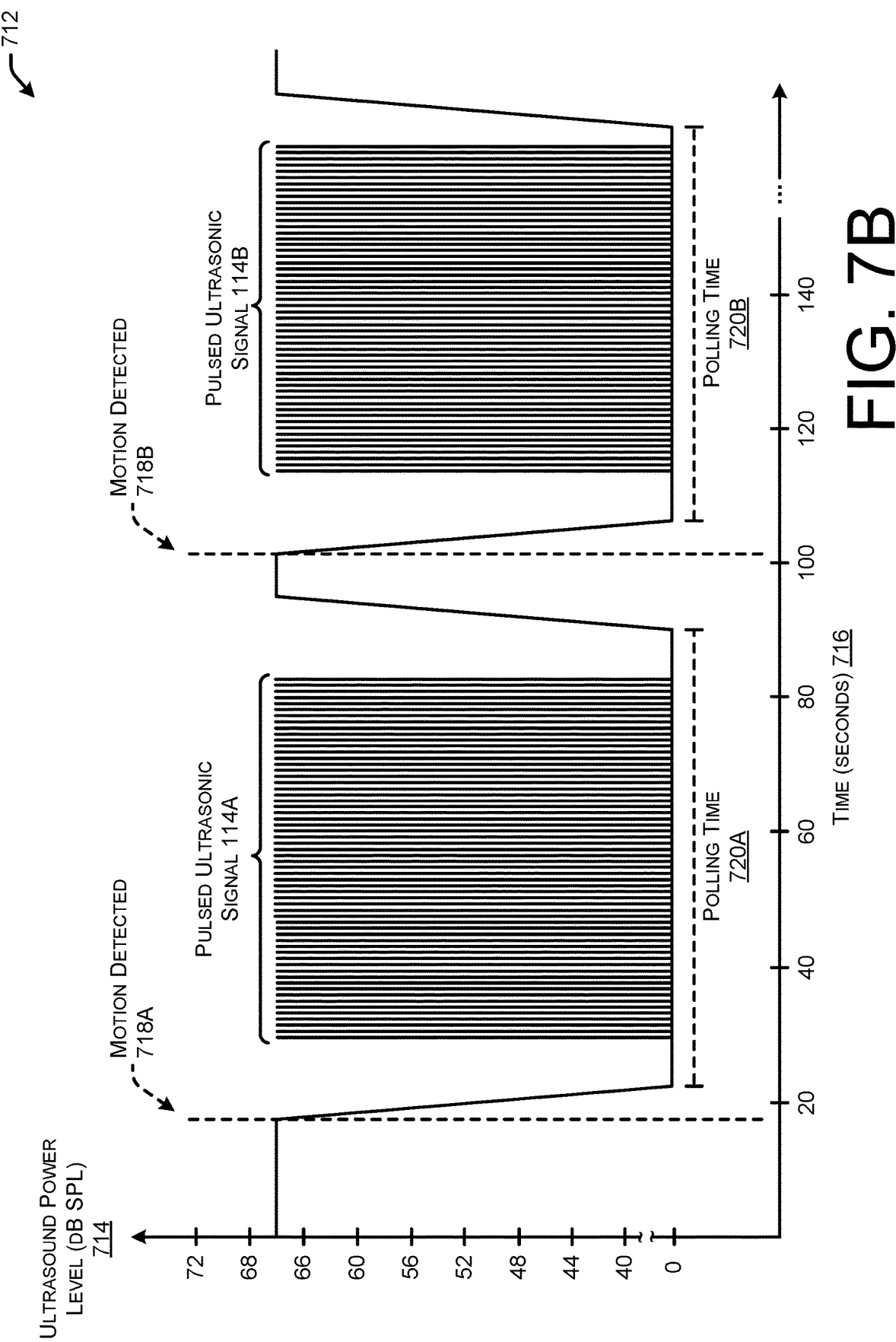
FIG. 7B illustrates another example diagram depicting emissions of continuous ultrasonic signals and pulsed ultrasonic signals over time.

FIG. 7B illustrates another example diagram 712 depicting emissions of continuous ultrasonic signals 114A and pulsed ultrasonic signals 114B over time.

As illustrated, the diagram 712 has an indication of ultrasound power level 714 on the y-axis in dB SPL, and time 716 on the x-axis in seconds. The diagram 712 illustrates points in time where motion is detected 718A-718B, and indications of how the emission power of the continuous ultrasonic signal 114A is turned off for polling times 720A-720C according to the polling process described herein. As shown, each time motion is detected 718 by a user device 104 using a continuous ultrasonic signal 114A, the continuous ultrasonic signal 114A may be turned off. The emission of the ultrasonic signal 114A may be turned off a polling time 720A.

As shown, pulsed ultrasonic signals 114B may be emitted during the polling times 720. However, as shown in FIG. 7A, the user 106 is within the threshold distance 710 from the user device 104, so the pulsed ultrasonic signals 114B continue to be emitted and the timer is continuously reset as long as proximity within the threshold distance 710 is detected. At around 80 seconds on the diagram 712, the proximity-sensing application 226 determines that proximity is not detected within the threshold distance 710 for longer than the timer, and the ultrasonic front end 210 may enter back into the presence-detection phase.

Figure 8:
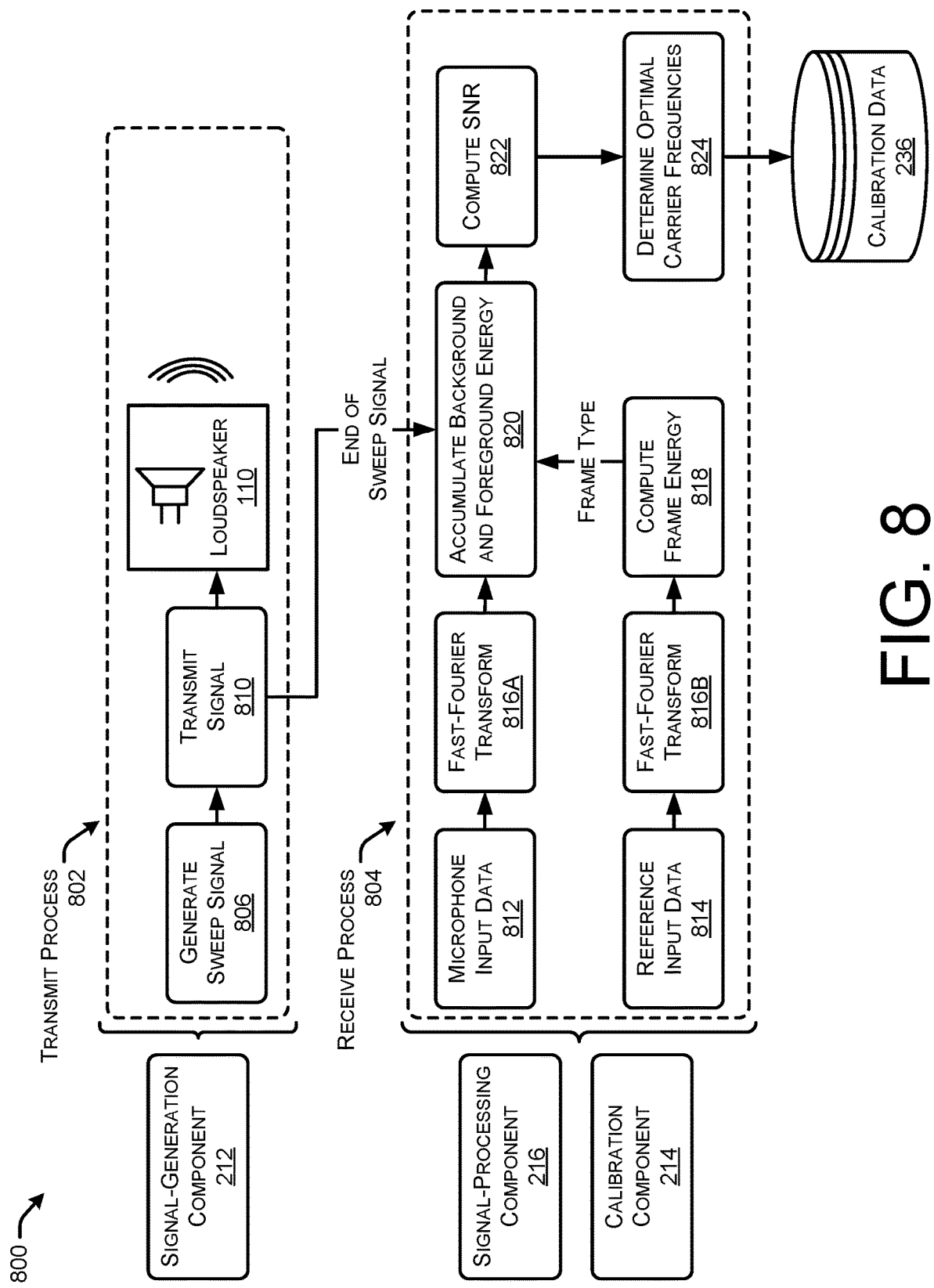
FIG. 8 illustrates an example high-level process for emitting an ultrasonic sweep signal into an environment, and analyzing audio data representing reflections of the ultrasonic sweep signal off objects in the environment to determine optimal carrier frequencies for ultrasonic signals of various ultrasonic applications.

FIG. 8 illustrates an example high-level process 800 for emitting an ultrasonic sweep signal into an environment 102, and analyzing audio data 238 representing reflections of the ultrasonic sweep signal off objects in the environment 102 to determine optimal carrier frequencies for ultrasonic signals of various ultrasonic applications 222.

In the transmit process 802, the signal-generation component 212 may generate an ultrasonic sweep signal at 806. The ultrasonic sweep signal may generally span multiple different frequencies that are in the ultrasonic range, or frequency ranges that are inaudible to humans (e.g., frequencies above 20 kilo Hertz (kHz)). As an example, the ultrasonic sweep signal includes multiple different frequencies in between 30 kHz and 42 kHz. In an example, the ultrasonic sweep signal may be a linear sweep signal that ramps up from 30 kHz to 42 kHz over a period of time (e.g., 500 ms).

At 810, the signal-generation component 212 may transmit the resulting signal to the loudspeaker 110, and the loudspeaker 110 may emit at least one or more ultrasonic sweep signals into the environment 102 of the user device 104. Further, the signal-generation component 212 may signal the end of the sweep signal to the signal-processing component 216 for use in the receive process 804.

In the receive process 804, the signal-processing component 216 may utilize microphone input data 812 (e.g., audio data 238 representing reflected ultrasonic signals 122 and any background noise) as well as reference input data 814. The reference input data 814 may correspond to audio data representing the ultrasonic sweep signal such that the reference input data 814 indicates timing according to which the microphone input data 812 represents foreground signals and background signals.

The microphone input data 812 may be transformed using a fast-Fourier transform 816A, and the reference input data 814 may also be input in a fast-Fourier transform 816B. For example, the signal-processing component 216 may perform various types of transforms to convert the audio data 812/814 from the time domain into the frequency domain, such as a Fourier transform, a fast Fourier transform, a Z transform, a Fourier series, a Hartley transform, and/or any other appropriate transform to represent or resolve the audio data 812/814 into their magnitude (or amplitude) components and phase components in the frequency domain.

At 818, the signal-processing component 216 may compute frame energy 818 for frames of the reference input data 814. The signal-processing component 216 may compute the energy at each frame and if the energy is above a threshold energy value, the frame represents foreground signals, and if the energy is below a threshold energy value, then the frame represents background signals. The signal-processing component 216 may provide indications as to the frame type to the step 820.

At 820, the signal-processing component 216 may accumulate background energy and foreground energy from the microphone input data 812 based on the frame type. Thus, when the frame type indicates foreground energy, the energy from the microphone input data 812 is stored as foreground-energy data. Conversely, when the frame type indicates background energy, the energy from the microphone input data 812 is stored as background-energy data.

At 822, the signal-processing component 216 computes the SNR values for each frequency range of the total frequency range in the ultrasonic sweep signal. That is, the background-energy data 240 may be used to attenuate or remove the noise signal representation from the foreground-energy data 240, and the SNR values may then be determined by dividing the foreground-energy data 240 by the background-energy data 240. At 824, the calibration component 214 may determine the optimal carrier frequency. For instance, the calibration component 214 may select a carrier frequency that is within a frequency range with the highest SNR value, or one of the highest SNR values.

FIGS. 9A, 9B, 10, 11, 12A-12B, 13, and 14A-14B illustrate flow diagrams of example processes 900, 1000, 1100, 1200, 1300, and 1400 that illustrate aspects of the functions performed at least partly by the user device 104 as described in this disclosure. The logical operations described herein with respect to FIGS. 9A, 9B, 10, 11, 12A-12B, 13, and 14A-14B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 9A, 9B, 10, 11, 12A-12B, 13, and 14A-14B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 9A, 9B, 10, 11, 12A-12B, 13, and 14A-14B collectively illustrate flow diagrams of example processes 900, 1000, 1100, 1200, 1300, and 1400, the steps of which may be performed by a user device 104 including a microphone 112, a loudspeaker 110, one or more processors 202, and one or more computer-readable media 204 storing computer-executable instructions that, when executed by the one or more processors, cause the one or more processors to perform operations of processes 900, 1000, 1100, 1200, 1300, and 1400.

Figure 9A:
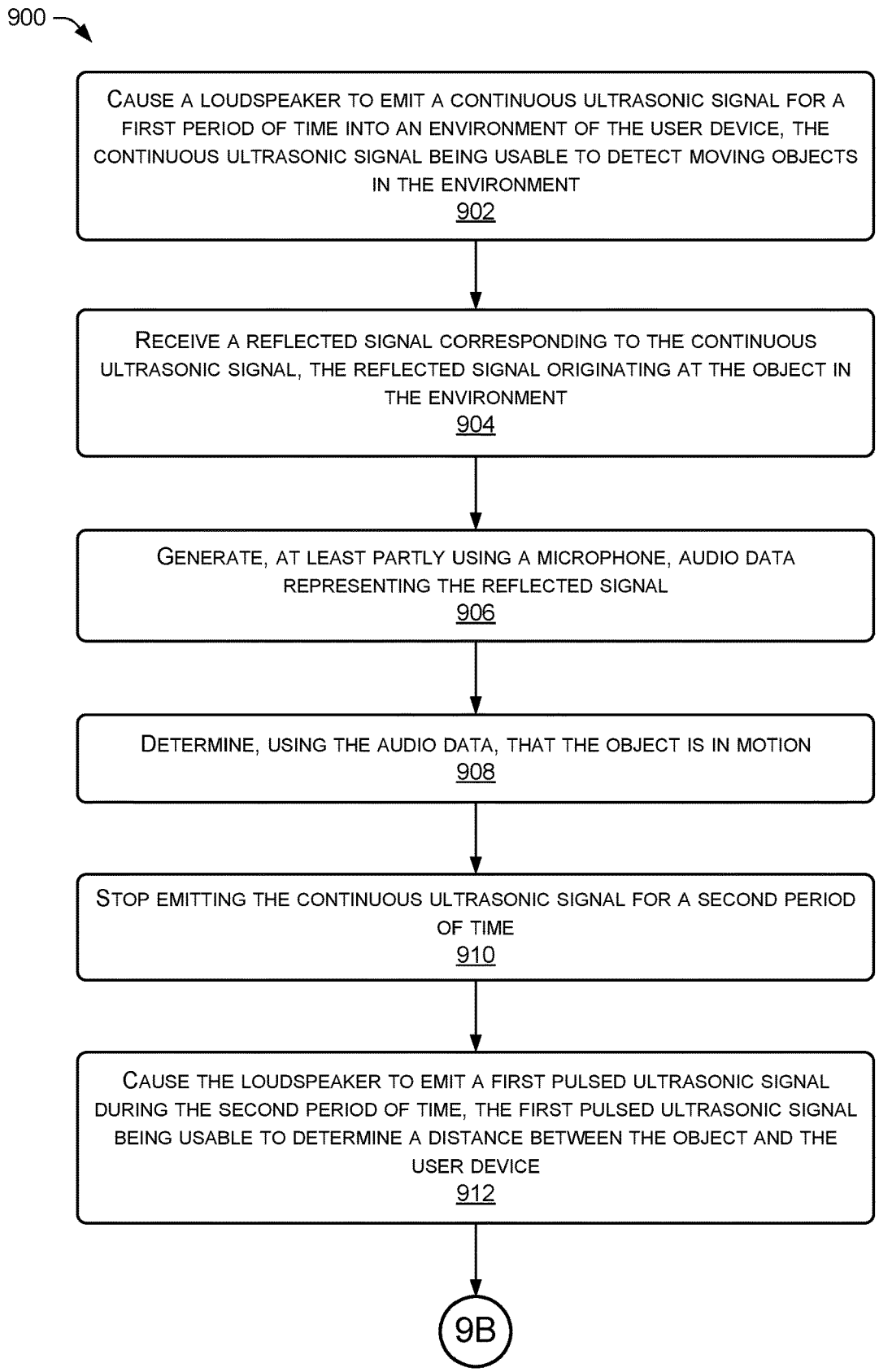
FIGS. 9A and 9B collectively illustrate a flow diagram of an example process for coordinating mutually-exclusive ultrasonic signal emissions for a presence-detection process and a proximity-sensing process.
Figure 9B:
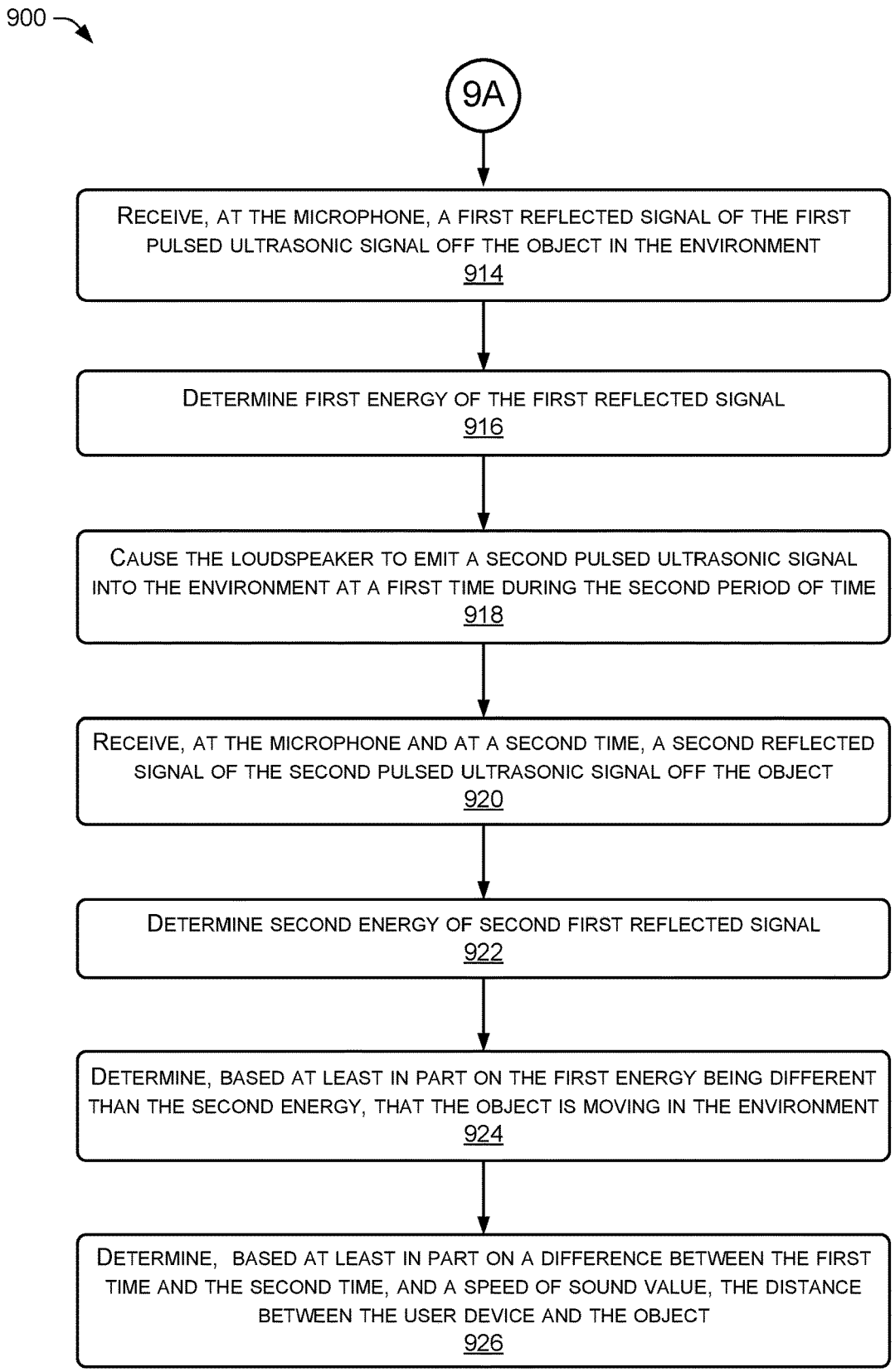

FIGS. 9A and 9B collectively illustrate a flow diagram of an example process 900 for coordinating mutually-exclusive ultrasonic signal emissions for a presence-detection process and a proximity-sensing process.

At 902, a user device 104 may cause the loudspeaker to emit a continuous ultrasonic signal 114A for a first period of time into an environment 102 of the user device 104. Generally, the continuous ultrasonic signal 114A is usable to detect moving objects in the environment 102 and be emitted using a continuous waveform 116.

At 904, the user device 104 may receive a reflected signal corresponding to the continuous ultrasonic signal 114A where the reflected signal originates at an object in the environment 102. In some instances, the reflected signal 122 may have a waveform corresponding to the continuous ultrasonic signal 114A.

At 906, the user device 104 may generate, at least partly using the microphone 112, audio data 238 representing the reflected signal 122. At 908, the user device 104 may determine, using the audio data, that the object is in motion. For example, the user device 104 may process the audio data 238 to identify a change in magnitude of the represented reflection signal 122 caused by the reflection of the continuous ultrasonic signal 114A off of the moving user 106 due to the Doppler effect.

At 910, the user device 104 may stop emitting the continuous ultrasonic signal for a second period of time. For instance, the presence-detection process 502 may enter into a polling time 620 or polling period after detecting movement.

At 912, the user device 104 may cause the loudspeaker to emit a first pulsed ultrasonic signal 114B during the second period of time. In some examples, the first pulsed ultrasonic signal 114B is usable to determine a distance between the object and the user device 104 and may be emitted in a proximity-sensing process 508.

At 914, the user device 104 may receive, at the microphone 112, a first reflected signal 122 of the first pulsed ultrasonic signal 114B off the object in the environment. At 916, the user device 104 may determine first energy of the first reflected signal. For instance, the user device 104 (e.g., signal-processing component 216) may determine an amplitude of the first reflected signal 114B when received at the proximity-sensing device 104.

At 918, the user device 104 may cause the loudspeaker 110 to emit a second pulsed ultrasonic signal 114B into the environment 102 at a first time during the second period of time. At 920, the user device 104 may receive, at the microphone 112 and at a second time, a second reflected signal 122B of the second pulsed ultrasonic signal 114B off the object. At 922, the user device 104 may determine second energy of second first reflected signal 122B. For instance, the user device 104 (e.g., signal-processing component 216) may determine an amplitude of the first reflected signal 114B when received at the proximity-sensing device 104.

At 924, the user device 104 may determine, based at least in part on the first energy being different than the second energy, that the object is moving in the environment. Increases or decreases in the energy across different frames generally indicates that the object is moving towards or away from the proximity-sensing device 104, and lack of change in energy (or changes less than a threshold) may indicate that the first object is not moving (e.g., static object).

At 926, the user device 104 may determine, based at least in part on a difference between the first time and the second time, and a speed of sound value, the distance between the user device and the object. For instance, the signal-processing component 216 may receive or identify the ToF values for reflected signals 122B, and map those ToF values to the energy values for the reflected signals 122B. The ToF is generally representative of distance with respect to sound signals or waves because the sound waves move at the speed of sound (e.g., 343 m/s), and ToF and speed of sound can be used to easily calculate distance. Thus, the signal-processing component 216 may determine the distance of the user 106 from the device 104.

In some instances, the process 900 may further include determining that the distance is greater than or equal to a threshold distance, identifying an end of the second period of time, and causing the loudspeaker 110 to emit another continuous ultrasonic signal 114A based at least in part on the end of the second period of time and the distance being greater than or equal to the threshold distance.

In some instances, the process 900 may further include based at least in part on determining that the object is in motion using the continuous ultrasonic signal, determining to emit pulsed ultrasonic signals 114B for the second period of time, determining that the first distance is less than or equal to a threshold distance, determining an end of the second period of time, the end of the second period of time being associated with the user device 104 emitting another continuous ultrasonic signal, and based at least in part on the first distance being less than or equal to the threshold distance causing the loudspeaker 110 to emit a third pulsed ultrasonic signal 114B into the environment during a third period of time.

Figure 10:
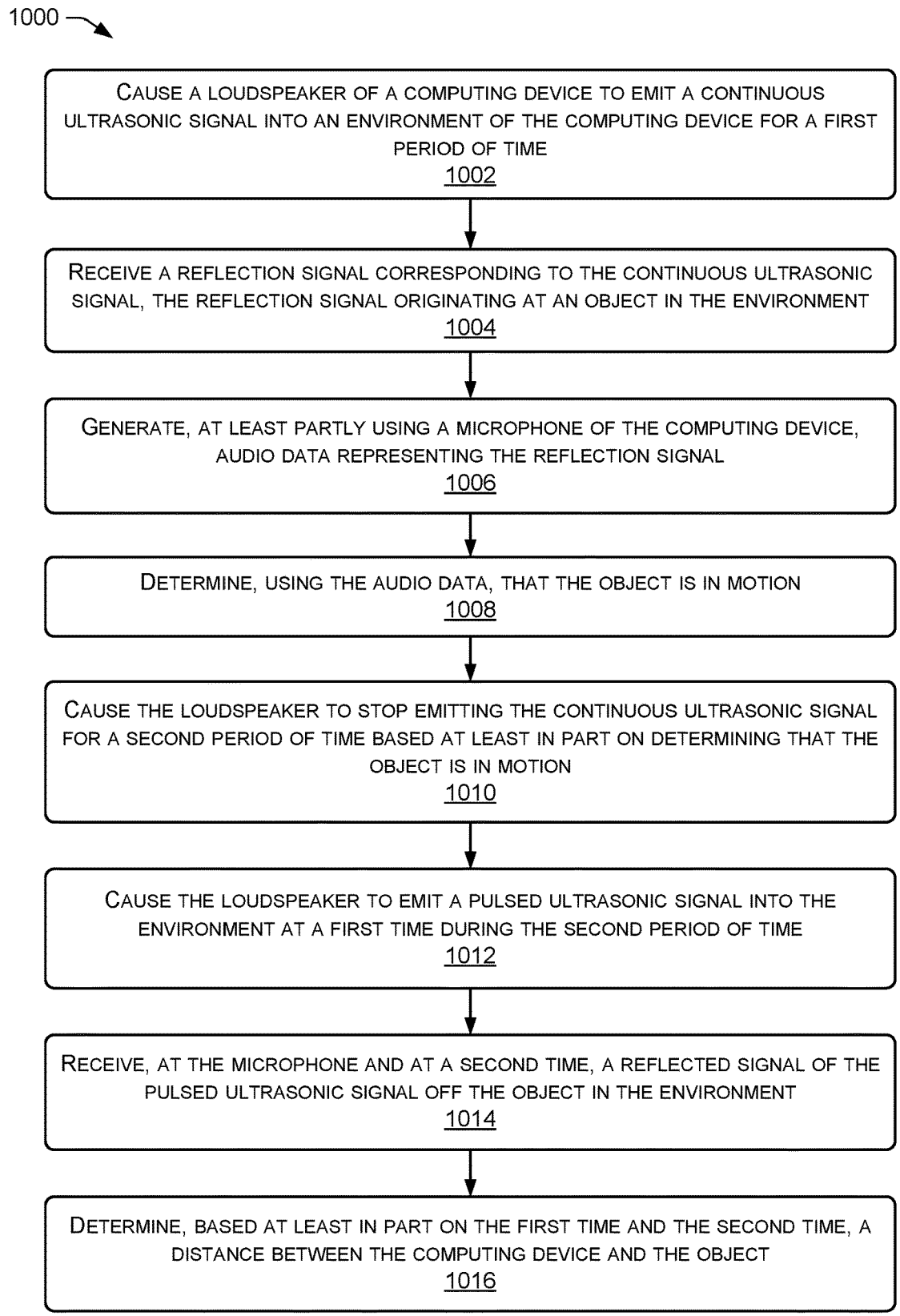
FIG. 10 illustrates a flow diagram of an example process for coordinating mutually-exclusive emissions of continuous ultrasonic signals and pulsed ultrasonic signals.

FIG. 10 illustrates a flow diagram of an example process 900 for coordinating mutually-exclusive emissions of continuous ultrasonic signals 114A and pulsed ultrasonic signals 114B.

At 1002, a computing device (e.g., user device 104) may cause the loudspeaker to emit a continuous ultrasonic signal 114A for a first period of time into an environment 102 of the user device 104. Generally, the continuous ultrasonic signal 114A is usable to detect moving objects in the environment 102 and be emitted using a continuous waveform.

At 1004, the computing device may receive a reflected signal corresponding to the continuous ultrasonic signal 114A where the reflected signal originates at an object in the environment 102. In some instances, the reflected signal 122 may have a waveform corresponding to the continuous ultrasonic signal 114A.

At 1006, the computing device may generate audio data 238 representing the reflected signal 122B. For instance, the computing device may use a microphone 112 to generate the audio data 238.

At 1008, the computing device may determine, using the audio data 128, that the object is in motion. For example, the user device 104 may process the audio data 238 to identify a change in magnitude of the represented reflection signal 122 caused by the reflection of the continuous ultrasonic signal 114A off of the moving user 106 due to the Doppler effect.

At 1010, the computing device may cause the loudspeaker 110 to stop emitting the continuous ultrasonic signal 114A for a second period of time. For instance, the presence-detection process 502 may enter into a polling time 620 or polling period after detecting movement.

At 1012, the computing device may cause the loudspeaker 110 to emit a pulsed ultrasonic signal 114B into the environment 102 at a first time during the second period of time. In some examples, the first pulsed ultrasonic signal 114B is usable to determine a distance between the object and the computing device and may be emitted in a proximity-sensing process 508.

At 1014, the computing device may receive at a second time, a second reflected signal 122B corresponding to the pulsed ultrasonic signal 114B where the second reflected signal originates at the object.

At 1016, the computing device may determine, based at least in part on the first time and the second time, a distance between the computing device and the object. For instance, the signal-processing component 216 may receive or identify the ToF values for reflected signals 122B, and map those ToF values to the energy values for the reflected signals 122B. The ToF is generally representative of distance with respect to sound signals or waves because the sound waves move at the speed of sound (e.g., 343 m/s), and ToF and speed of sound can be used to easily calculate distance. Thus, the signal-processing component 216 may determine the distance of the user 106 from the device 104.

In some instances, the process 1000 may further include determining that the distance is greater than or equal to a threshold distance, determining end of the second period of time, causing the loudspeaker to stop emitting pulsed ultrasonic signals for a third period of time, the third period of time being after the second period of time, and causing the loudspeaker to emit a second continuous ultrasonic signal during the third period of time. in such examples, the process 1000 may further include receiving a second reflected signal corresponding to the second continuous ultrasonic signal, the second reflected signal originating at the object, generating second audio data representing the second reflected signal, determining, using the second audio data, that the object is in motion during the third period of time, stopping emitting the second continuous ultrasonic signal for a fourth period of time that is greater than the third period of time, and causing the loudspeaker to stop emitting the second continuous ultrasonic signal for the fourth period of time.

In some examples, the process 1000 may further include determining that the distance is greater than or equal to a threshold distance, determining to continue emission of pulsed ultrasonic signals for a third period of time that ends before the first period of time, during the third period of time, causing the loudspeaker to emit a second pulsed ultrasonic signal into the environment at a third time, receiving at a fourth time, a third reflected signal corresponding to the second pulsed ultrasonic signal, the third reflected signal originating at the object, determining, based at least in part on the third time and the fourth time, a second distance between the computing device and the object, determining that the second distance is less than or equal to the threshold distance, and determining to continue emission of pulsed ultrasonic signals for a fourth period of time based at least in part on the second distance being less than or equal to the threshold distance, wherein the fourth period of time ends after the first period of time.

In some examples, the process 1000 may further include determining that the distance is greater than or equal to a threshold distance, during a third period of time, causing the loudspeaker to emit a second pulsed ultrasonic signal into the environment at a third time, receiving at a fourth time, a second reflected signal of the second pulsed ultrasonic signal off the object in the environment, determining, based at least in part on the third time and the fourth time, a second distance between the computing device and the object, determining that the second distance is greater than or equal to a threshold distance, determining an end of the third period of time, causing the loudspeaker to stop emitting pulsed ultrasonic signals for a remainder of the second period of time, and in response to detecting an end of the second period of time, causing the loudspeaker to second continuous ultrasonic signal into the environment for a fourth period of time.

Figure 11:
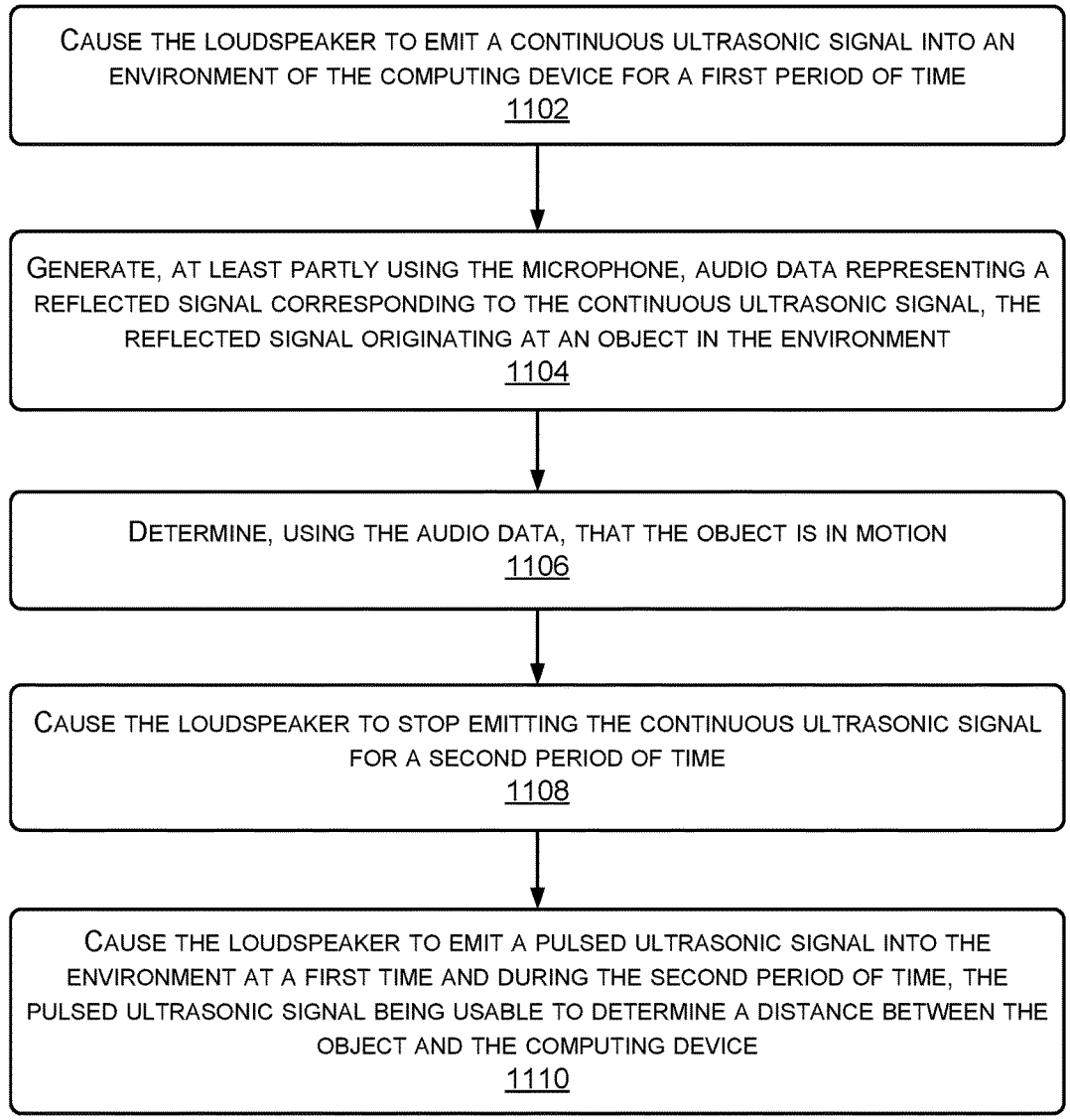
FIG. 11 illustrates a flow diagram of an example process for emitting a continuous ultrasonic signal into an environment to detect an object in motion, and in response to detecting the object in motion, stopping the emission of the continuous ultrasonic signal and causing emission of a pulsed ultrasonic signal.

FIG. 11 illustrates a flow diagram of an example process 1100 for emitting a continuous ultrasonic signal 114A into an environment 102 to detect an object in motion, and in response to detecting the object in motion, stopping the emission of the continuous ultrasonic signal and causing emission of a pulsed ultrasonic signal.

At 1102, a user device 104 may cause the loudspeaker to emit a continuous ultrasonic signal 114A for a first period of time into an environment 102 of the user device 104. Generally, the continuous ultrasonic signal 114A is usable to detect moving objects in the environment 102 and be emitted using a continuous tone waveform 408.

At 1104, a user device 104 may generate, at least partly using the microphone 112, audio data 238 representing a reflected signal 114A corresponding to the continuous ultrasonic signal 114A where the reflected signal originates at an object in the environment.

At 1106, a user device 104 may determine, using the audio data, that the object is in motion. For example, the user device 104 may process the audio data 238 to identify a change in magnitude of the represented reflection signal 122 caused by the reflection of the continuous ultrasonic signal 114A off of the moving user 106 due to the Doppler effect.

At 1108, a user device 104 may cause the loudspeaker to stop emitting the continuous ultrasonic signal for a second period of time. For instance, the presence-detection process 502 may enter into a polling time 620 or polling period after detecting movement.

At 1110, a user device 104 may cause the loudspeaker to emit a pulsed ultrasonic signal 114B into the environment at a first time and during the second period of time. In some examples, the pulsed ultrasonic signal 114B being usable to determine a distance between the object and the computing device.

FIGS. 12A and 12B collectively illustrate a flow diagram of an example process 1200 for coordinating the emissions of ultrasonic signals on behalf of different ultrasonic applications 222 that are operating on a computing device based on priorities of the applications.

At 1202, the computing device may execute a first application on the computing device, the first application performing a first function at least partly using a first ultrasonic signal. At 1204, the computing device may execute a second application on the computing device, the second application performing a second function at least partly using a second ultrasonic signal. The second function may be different than the first function and the first ultrasonic signal may be different than the second ultrasonic signal.

In some examples, the first ultrasonic signal comprises a frequency modulated continuous wave (FMCW), and the second ultrasonic signal comprises a single-tone signal. In such an example, the first application is at least one of a sleep-monitoring application 228 configured to utilize the first reflected signal 122 to determine sleep related parameters of an enrolled user, or a heartbeat-detection application 232 configured to utilize the first ultrasonic signal 114 to determine heartbeat related parameters of the enrolled user. Further, the second application is at least one of a presence-detection application 224 configured to utilize the second ultrasonic signal 114 to detect the enrolled user, or a proximity-sensing application 226 configured to utilize the second ultrasonic signal 114 to determine a distance between the enrolled user and the computing device.

At 1206, the computing device may emit the first ultrasonic signal into an environment for a first period of time. At 1208, the computing device may generate first audio data 238 representing a first reflected signal 122 corresponding to the first ultrasonic signal 114, and at 1210, the computing device may provide the first audio data 238 to the first application 222. In some examples, the first audio data 238 is usable by the first application 222 to perform the first function.

At 1212, the computing device may receive a request to emit the second ultrasonic signal 114 for the second application 222. For instance, the second application 222 may determine an event that triggers the second application 222 to perform the second functionality, such as a time in a predefined schedule, a request from the user 106, and/or an event associated with the user device 104.

At 1214, the computing device may identify a first priority of the first application 222, and at 1216, the computing device may identify a second priority of the second application 222. The priorities may be indicated by the user 106, and or the applications 222 themselves, and be stored in the computing device in the coordination logic 242.

In some instances, the computing device may determine that the second priority is greater than the first priority, and at 1218, the computing device may stop emitting the first ultrasonic signal 114. Further, at 1220, the computing device may emit the second ultrasonic signal 114 into the environment 102 for a second period of time.

At 1222, the computing device may generate second audio data 238 representing a second reflected signal 114 corresponding to the second ultrasonic signal 114, and at 1224, the computing device may provide the second audio data 238 to the second application 222 where the second audio data 238 is usable by the second application 222 to perform the second function.

In some instances, the process 1200 may further include outputting the first ultrasonic signal 114 with a first waveform, outputting the second ultrasonic signal 114 with a second waveform, the first waveform being different than the second waveform, extracting, from the first audio data 238, first data usable by the first application 222 to perform the first function, wherein the first data is represented in the first waveform, and extracting, from the second audio data 238, second data usable by the second application 222 to perform the second function, wherein the second data is represented in the second waveform.

In some instances, the first ultrasonic signal 114 is emitted with a first ultrasonic waveform and the second ultrasonic signal 114 is emitted with a second ultrasonic waveform. In some instances, the process 1200 may further include determining that a third application 222 performs a third function at least partly using the first ultrasonic waveform of the first ultrasonic signal 114, generating, using the first audio data 238, first data usable by the first application 222 to perform the first function and usable by the third application 222 to perform the third function, providing the first data to the first application 222, and providing the first data to the third application 222.

FIG. 13 illustrates a flow diagram of an example process 1300 for coordinating the emissions of ultrasonic signals 114 with different waveforms on behalf of different ultrasonic applications 222.

At 1302, the computing device (e.g., user device 104) may cause, by a first application 222 running on the computing device, output of a first ultrasonic signal 114 into an environment 102 of the computing device. At 1304, the computing device (e.g., user device 104) may generate first data representing a first reflected signal 122 corresponding to the first ultrasonic signal 114.

At 1306, the computing device (e.g., user device 104) may provide the first data to the first application 222 where the first data is usable by the first application 222 to perform a first function (e.g., heartbeat monitoring, presence detection, proximity sensing, temperature/humidity sensing, etc.).

At 1308, the computing device (e.g., user device 104) may cause the loudspeaker to stop emitting the first ultrasonic signal 114. At 1310, the computing device (e.g., user device 104) may cause, by a second application 222 running on the computing device, the loudspeaker 110 to emit a second ultrasonic signal 114 having a second waveform into the environment. Generally, the first waveform is different than the second waveform such that the first and second ultrasonic signals 114 cannot be used to generate data usable by both of the first and second applications 222.

At 1312, the computing device (e.g., user device 104) may generate second data representing a second reflected signal corresponding to the second ultrasonic signal. At 1314, the computing device (e.g., user device 104) may provide the second data to the second application, the second data being usable by the second application to perform a second function. Accordingly, the computing device may arbitrate between which application 222 is able to operate based on the ultrasonic applications 222 using different waveforms.

Figure 14A:
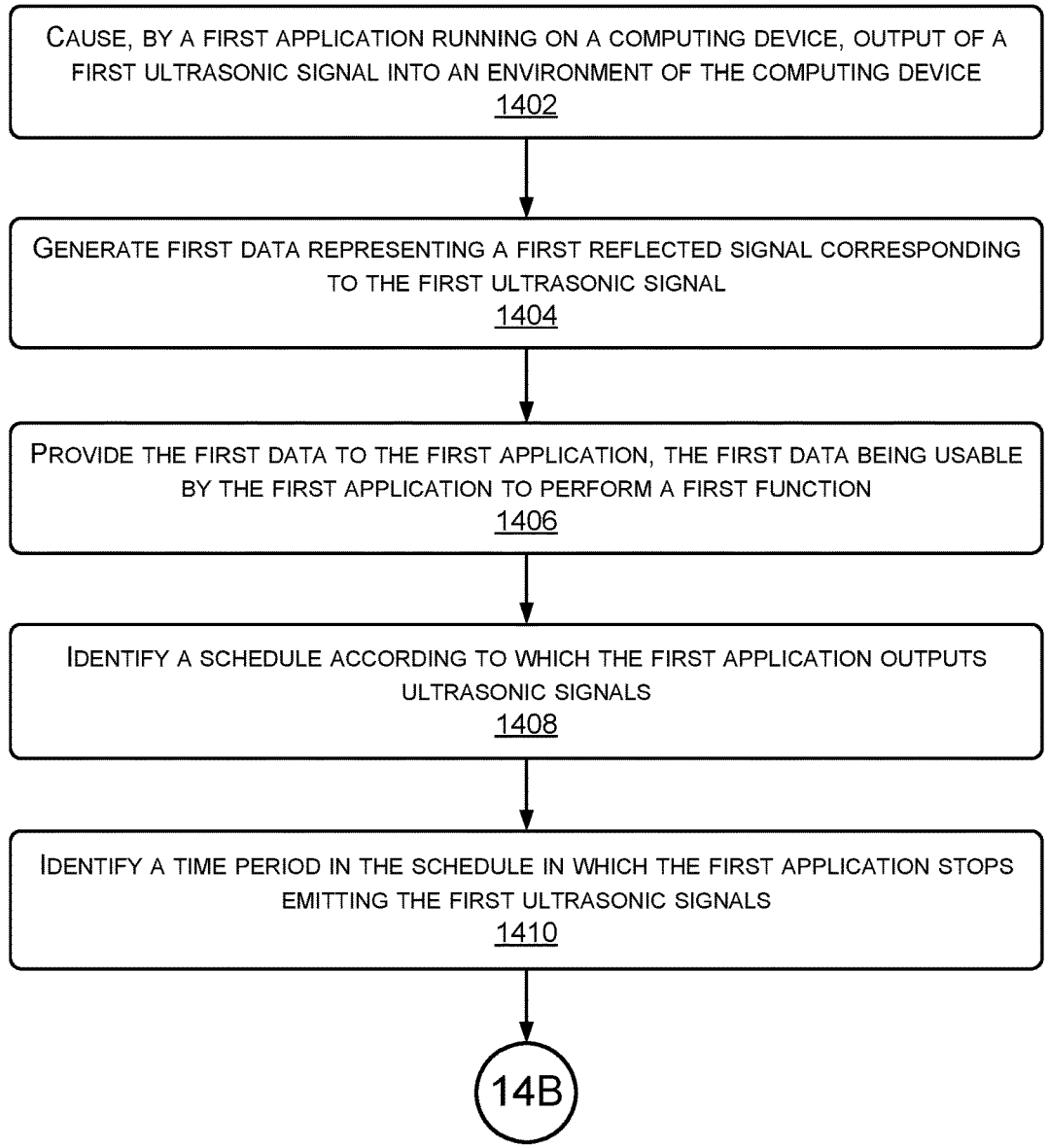
FIGS. 14A and 14B collectively illustrate a flow diagram of an example process for coordinating the emissions of ultrasonic signals on behalf of different ultrasonic applications that are operating on a computing device based on a predefined schedule according to which one of the ultrasonic applications emits ultrasonic signals.
Figure 14B:
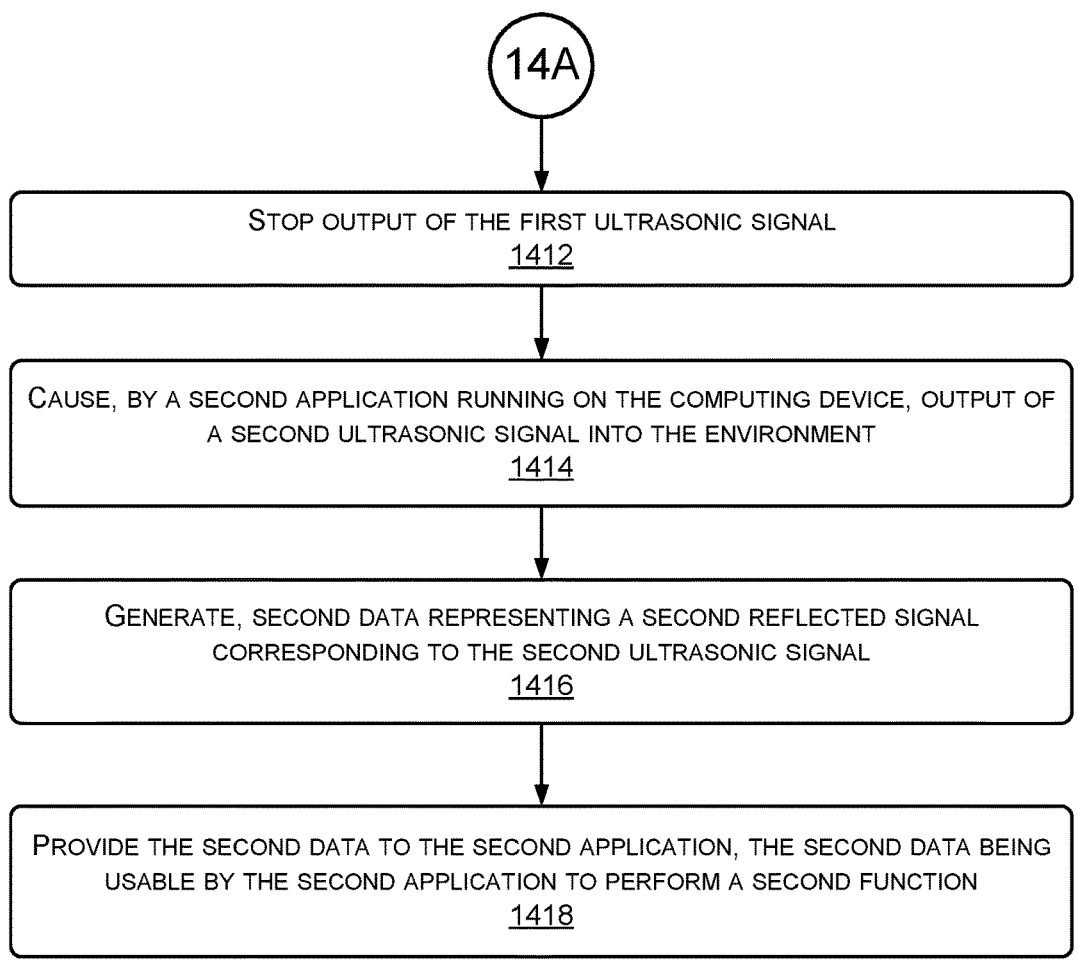

FIGS. 14A and 14B collectively illustrate a flow diagram of an example process 1400 for coordinating the emissions of ultrasonic signals 114 on behalf of different ultrasonic applications 222 that are operating on a computing device based on a schedule according to which one of the ultrasonic applications 222 emits ultrasonic signals.

At 1402, a computing device (e.g., user device 104) may cause, by a first application 222 running on the computing device, output of a first ultrasonic signal 114 into an environment 102 of the computing device. At 1404, the computing device (e.g., user device 104) may generate first data representing a first reflected signal 122 corresponding to the first ultrasonic signal 114.

At 1406, the computing device may provide the first data to the first application 222 where the first data is usable by the first application 222 to perform a first function.

At 1408, the computing device may identify a schedule according to which the first application 222 outputs ultrasonic signals 114. The schedule may be provided by the first application 222 and be stored in the coordination logic 242. The schedule may indicate times at which the first application 222 is to emit ultrasonic signals 114 to collect data usable to perform the functionality of the first application 222.

At 1410, the computing device may identify a time period in the schedule in which the first application 222 stops emitting the first ultrasonic signals 114. For instance, the schedule may indicate times or time periods in which the first application 222 emits the first ultrasonic signals 114, and may further indicate times or time periods in which the first application 222 stops emitting the first ultrasonic signals 114 (e.g., down times or quiet times). The schedule may differ depending on the particular application 222. For instance, a sleep-monitoring application 228 may operate periodically, such as every 30 seconds or 1 minute, and have down times of 30 seconds or 1 minute.

At 1412, the computing device may stop output of the first ultrasonic signal 114, and at 1414, the computing device may cause, by a second application 222 running on the computing device, output of a second ultrasonic signal 114 into the environment.

At 1416, the computing device may generate, second data representing a second reflected signal 122 corresponding to the second ultrasonic signal 114, and at 1418, the computing device may provide the second data to the second application 222 and the second data being usable by the second application 222 to perform a second function.

As used herein, a processor, such as processor(s) 202 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

As described herein, computer-readable media and/or memory 204 may include volatile and nonvolatile memory, removable and non-removable media implemented in any method or technology for storage of information, such as computer-readable instructions, data structures, program component, or other data. Such computer-readable media and/or memory 204 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 to execute instructions stored on the computer-readable media and/or memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 204, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 254 may enable communications between the user device 104 and other networked devices. Such network interface(s) 254 can include one or more network interface controllers (NICs) or other types of transceiver devices to send and receive communications over a network. For instance, the network interface(s) 254 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 254 may include a wide area network (WAN) component to enable communication over a wide area network. The networks that the user device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A user device comprising:
    a microphone;
    a loudspeaker;
    one or more processors; and
    one or more computer-readable media storing computer-executable instructions that, when executed by the one or more processors, cause the one or more processors to perform operations comprising:
        causing the loudspeaker to emit a continuous ultrasonic signal for a first period of time into an environment of the user device, the continuous ultrasonic signal being usable to detect moving objects in the environment;
receiving a reflected signal corresponding to the continuous ultrasonic signal, the reflected signal originating at an object in the environment;
generating, at least partly using the microphone, audio data representing the reflected signal;
determining, using the audio data, that the object is in motion;
stopping emitting the continuous ultrasonic signal for a second period of time;
causing the loudspeaker to emit a first pulsed ultrasonic signal during the second period of time, the first pulsed ultrasonic signal being usable to determine a distance between the object and the user device;
receiving, at the microphone, a first reflected signal of the first pulsed ultrasonic signal off the object in the environment;
determining first energy of the first reflected signal;
causing the loudspeaker to emit a second pulsed ultrasonic signal into the environment at a first time during the second period of time;
receiving, at the microphone and at a second time, a second reflected signal of the second pulsed ultrasonic signal off the object;
determining second energy of second first reflected signal;
determining, based at least in part on the first energy being different than the second energy, that the object is moving in the environment; and
determining, based at least in part on a difference between the first time and the second time, and a speed of sound value, the distance between the user device and the object.

2. The user device of claim 1, the operations further comprising:
determining that the distance is greater than or equal to a threshold distance;
identifying an end of the second period of time; and
causing the loudspeaker to emit another continuous ultrasonic signal based at least in part on the end of the second period of time and the distance being greater than or equal to the threshold distance.

3. The user device of claim 1, wherein the distance is a first distance, the operations further comprising:
based at least in part on determining that the object is in motion using the continuous ultrasonic signal, emitting pulsed ultrasonic signals for the second period of time;
determining that the first distance is less than or equal to a threshold distance;
determining an end of the second period of time, the end of the second period of time being associated with the user device emitting another continuous ultrasonic signal;
based at least in part on the first distance being less than or equal to the threshold distance causing the loudspeaker to emit a third pulsed ultrasonic signal into the environment during a third period of time.

4. The user device of claim 1, the operations further comprising:
causing the loudspeaker to emit an ultrasonic sweep signal into the environment, the ultrasonic sweep signal being emitted at different frequencies in a total frequency range;
generating, at least partly using the microphone, second audio data representing reflected signals corresponding to the ultrasonic sweep signal;
determining, using the second audio data, a first signal-to-noise (SNR) ratio associated with a first frequency range within the total frequency range of the ultrasonic sweep signal;
determining, using the second audio data, a second SNR ratio associated with a second frequency range within the total frequency range of the ultrasonic sweep signal;
determining that the first SNR ratio is greater than the second SNR ratio; and
emitting the continuous ultrasonic signal, the first pulsed ultrasonic signal and the second pulsed ultrasonic signal at a frequency that is within the first frequency range.

5. A method comprising, by a computing device:
causing a loudspeaker of the computing device to emit a continuous ultrasonic signal into an environment of the computing device for a first period of time;
receiving a first reflected signal corresponding to the continuous ultrasonic signal, the first reflected signal originating at an object in the environment;
generating audio data representing the first reflected signal;
determining, using the audio data, that the object is in motion;
causing the loudspeaker to stop emitting the continuous ultrasonic signal for a second period of time;
causing the loudspeaker to emit a pulsed ultrasonic signal into the environment at a first time during the second period of time;
receiving at a second time, a second reflected signal corresponding to the pulsed ultrasonic signal, the second reflected signal originating at the object;
determining, based at least in part on the first time and the second time, a distance between the computing device and the object.

6. The method of claim 5, further comprising:
determining that the distance is greater than or equal to a threshold distance;
determining end of the second period of time;
causing the loudspeaker to stop emitting pulsed ultrasonic signals for a third period of time, the third period of time being after the second period of time; and
causing the loudspeaker to emit a second continuous ultrasonic signal during the third period of time.

7. The method of claim 6, further comprising:
receiving a second reflected signal corresponding to the second continuous ultrasonic signal, the second reflected signal originating at the object;
generating second audio data representing the second reflected signal;
determining, using the second audio data, that the object is in motion during the third period of time;
stopping emitting the second continuous ultrasonic signal for a fourth period of time that is greater than the third period of time; and
causing the loudspeaker to stop emitting the second continuous ultrasonic signal for the fourth period of time.

8. The method of claim 5, further comprising:
determining that the distance is less than or equal to a threshold distance;
identifying an end of the second period of time;
based at least in part on the distance being less than or equal to the threshold distance:

emitting pulsed ultrasonic signals for a third period of time; and causing the loudspeaker to emit a third pulsed ultrasonic signal into the environment during the third period of time.

9. The method of claim 5, further comprising:

causing the loudspeaker to emit an ultrasonic sweep signal into the environment, the ultrasonic sweep signal being emitted at different frequencies;

generating second audio data representing reflected signals corresponding to the ultrasonic sweep signal;

determining, using the second audio data, a first signal-to-noise (SNR) ratio associated with a first frequency range;

determining, using the second audio data, a second SNR ratio associated with a second frequency range within;

determining that the first SNR ratio is greater than the second SNR ratio; and emitting the continuous ultrasonic signal and the pulsed ultrasonic signal at a frequency that is within the first frequency range.

10. The method of claim 5, wherein the pulsed ultrasonic signal is a first pulsed ultrasonic signal, further comprising:

determining that the distance is greater than or equal to a threshold distance;

emitting pulsed ultrasonic signals for a third period of time that ends before the first period of time;

during the third period of time, causing the loudspeaker to emit a second pulsed ultrasonic signal into the environment at a third time;

receiving at a fourth time, a third reflected signal corresponding to the second pulsed ultrasonic signal, the third reflected signal originating at the object;

determining, based at least in part on the third time and the fourth time, a second distance between the computing device and the object;

determining that the second distance is less than or equal to the threshold distance; and emitting pulsed ultrasonic signals for a fourth period of time based at least in part on the second distance being less than or equal to the threshold distance, wherein the fourth period of time ends after the first period of time.

11. The method of claim 5, wherein the pulsed ultrasonic signal is a first pulsed ultrasonic signal, further comprising:

determining that the distance is greater than or equal to a threshold distance;

during a third period of time, causing the loudspeaker to emit a second pulsed ultrasonic signal into the environment at a third time;

receiving at a fourth time, a second reflected signal of the second pulsed ultrasonic signal off the object in the environment;

determining, based at least in part on the third time and the fourth time, a second distance between the computing device and the object;

determining that the second distance is greater than or equal to a threshold distance;

determining an end of the third period of time;

causing the loudspeaker to stop emitting pulsed ultrasonic signals for a remainder of the second period of time; and in response to detecting an end of the second period of time, causing the loudspeaker to emit a second continuous ultrasonic signal into the environment for a fourth period of time.

12. The method of claim 5, wherein the pulsed ultrasonic signal is a first pulsed ultrasonic signal, and the reflected signal is a first reflected signal, further comprising:

determining first energy of the first reflected signal;

causing the loudspeaker to emit a second pulsed ultrasonic signal into the environment at a third time;

receiving, at a fourth time, a second reflected signal of the second pulsed ultrasonic signal off the object in the environment;

determining second energy of the second reflected signal;

determining, based at least in part on the first energy being different than the second energy, that the object is moving in the environment; and determining, based at least in part on the third time and the fourth time, a distance between the computing device and the object.

13. A computing device comprising:

a loudspeaker;

a microphone one or more processors; and one or more computer-readable media storing computer-executable instructions that, when executed by the one or more processors, cause the one or more processors to perform operations comprising:

causing the loudspeaker to emit a continuous ultrasonic signal into an environment of the computing device for a first period of time;

generating, at least partly using the microphone, audio data representing a reflected signal corresponding to the continuous ultrasonic signal, the reflected signal originating at an object in the environment;

determining, using the audio data, that the object is in motion;

causing the loudspeaker to stop emitting the continuous ultrasonic signal for a second period of time; and causing the loudspeaker to emit a pulsed ultrasonic signal into the environment at a first time and during the second period of time, the pulsed ultrasonic signal being usable to determine a distance between the object and the computing device.

14. The computing device of claim 13, the operations further comprising:

receiving, at the microphone and at a second time, a second reflected signal of the pulsed ultrasonic signal off the object in the environment;

determining, based at least in part on the first time and the second time, a distance between the computing device and the object;

determining that the distance is greater than or equal to a threshold distance;

determining an end of the second period of time;

causing the loudspeaker to stop emitting pulsed ultrasonic signals for a third period of time; and causing the loudspeaker to emit a second continuous ultrasonic signal during the third period of time.

15. The computing device of claim 14, the operations further comprising:

receiving a third reflected signal corresponding to the second continuous ultrasonic signal, the third reflected signal originating at the object;

generating, at least partly using the microphone, second audio data representing the third reflected signal;

determining, using the second audio data, that the object is in motion during the third period of time;

causing the loudspeaker to stop emitting the second continuous ultrasonic signal for the fourth period of time.

16. The computing device of claim 13, the operations further comprising:
receiving, at the microphone and at a second time, a second reflected signal of the pulsed ultrasonic signal off the object in the environment;
determining, based at least in part on the first time and the second time, a distance between the computing device and the object;
determining that the distance is less than or equal to a threshold distance;
emitting pulsed ultrasonic signals for a second period of time;
determining an end of the second period of time; and
causing the loudspeaker to emit a third pulsed ultrasonic signal into the environment during a third period of time.

17. The computing device of claim 13, the operations further comprising:
receiving, at a second time, a second reflected signal of the pulsed ultrasonic signal off the object in the environment;
determining, based at least in part on the first time and the second time, a distance between the computing device and the object;
determining that the distance is greater than or equal to a threshold distance;
based at least in part on the distance being greater than or equal to the threshold distance, causing the loudspeaker to emit a second pulsed ultrasonic signal into the environment at a third time and during a third period of time;
receiving, at a fourth time, a third reflected signal of the second pulsed ultrasonic signal off the object in the environment;
determining, based at least in part on the third time and the fourth time, a second distance between the computing device and the object;
determining that the second distance is less than or equal to a threshold distance; and
emitting pulsed ultrasonic signals for a fourth period of time based at least in part on the second distance being less than or equal to the threshold distance, wherein the fourth period of time ends after the second period of time.

18. The computing device of claim 13, wherein the pulsed ultrasonic signal is a first pulsed ultrasonic signal, and the reflected signal is a first reflected signal, the operations further comprising:
receiving, at a second time, a second reflected signal of the pulsed ultrasonic signal off the object in the environment;
determining, based at least in part on the first time and the second time, a distance between the computing device and the object;
determining that the distance is greater than or equal to a threshold distance;
based at least in part on the distance being greater than or equal to the threshold distance, causing the loudspeaker to emit a second pulsed ultrasonic signal at a third time during a third period of time ends before the second period of time;
receiving, at a fourth time, a second reflected signal of the second pulsed ultrasonic signal off the object in the environment;
determining, based at least in part on the third time and the fourth time, a second distance between the computing device and the object;
determining that the second distance is greater than or equal to a threshold distance;
determining an end of the third period of time; and
stopping emitting pulsed ultrasonic signals for a remainder of the second period of time.

19. The computing device of claim 14, wherein the pulsed ultrasonic signal is a first pulsed ultrasonic signal, and the reflected signal is a first reflected signal, the operations further comprising:
receiving, at the microphone and at a second time, a second reflected signal of the pulsed ultrasonic signal off the object in the environment;
determining first energy of the second reflected signal;
causing the loudspeaker to emit a second pulsed ultrasonic signal into the environment at a third time;
receiving, at the microphone and at a fourth time, a third reflected signal of the second pulsed ultrasonic signal off the object in the environment;
determining second energy of the third reflected signal;
determining, based at least in part on the first energy being different than the second energy, that the object is moving in the environment; and
determining, based at least in part on the third time and the fourth time, a distance between the computing device and the object.

20. The computing device of claim 14, the operations further comprising:
causing the loudspeaker to emit an ultrasonic sweep signal into the environment, the ultrasonic sweep signal being emitted at different frequencies in a total frequency range;
generating second audio data representing reflected signals corresponding to the ultrasonic sweep signal;
determining, using the second audio data, a first signal-to-noise (SNR) ratio associated with a first frequency range within the total frequency range;
determining, using the second audio data, a second SNR ratio associated with a second frequency range within the total frequency range;
determining that the first SNR ratio is greater than the second SNR ratio; and
emitting the continuous ultrasonic signal and the pulsed ultrasonic signal at a frequency that is within the first frequency range.

* * * * *